United States Patent
Khan et al.

(10) Patent No.: US 12,299,985 B2
(45) Date of Patent: May 13, 2025

(54) PEAK LABEL OBJECT DETECTION SYSTEM AND METHOD OF USING

(71) Applicant: NEC CORPORATION, Tokyo (JP)

(72) Inventors: Nagma Samreen Khan, Tokyo (JP); Kazumine Ogura, Tokyo (JP); Masayuki Ariyoshi, Tokyo (JP); Eric Cosatto, Princeton, NJ (US)

(73) Assignee: NEC CORPORATION, Tokyo (JP)

( * ) Notice: Subject to any disclaimer, the term of this patent is extended or adjusted under 35 U.S.C. 154(b) by 651 days.

(21) Appl. No.: 17/586,614

(22) Filed: Jan. 27, 2022

(65) Prior Publication Data

US 2023/0237803 A1 Jul. 27, 2023

(51) Int. Cl.
*G06T 7/00* (2017.01)
*G06T 7/10* (2017.01)
*G06V 20/50* (2022.01)

(52) U.S. Cl.
CPC .............. *G06V 20/50* (2022.01); *G06T 7/10* (2017.01); *G06T 2200/04* (2013.01); *G06T 2207/10044* (2013.01); *G06T 2207/20081* (2013.01)

(58) Field of Classification Search
CPC ........ G06V 20/50; G06V 10/25; G06V 10/82; G06V 20/52; G06T 7/10; G06T 2200/04; G06T 2207/10044; G06T 2207/20081
See application file for complete search history.

(56) References Cited

U.S. PATENT DOCUMENTS

| | | | | |
|---|---|---|---|---|
| 5,692,029 A | * | 11/1997 | Husseiny | G01V 11/00 378/86 |
| 2010/0046704 A1 | * | 2/2010 | Song | G01N 23/04 378/57 |
| 2019/0147220 A1 | | 5/2019 | Mccormac et al. | |
| 2020/0193666 A1 | * | 6/2020 | Cinnamon | G06T 1/0007 |
| 2020/0272822 A1 | * | 8/2020 | Lin | G06F 18/214 |

(Continued)

FOREIGN PATENT DOCUMENTS

| EP | 3428849 A1 | 1/2019 |
|---|---|---|
| WO | 2005036207 A2 | 4/2005 |
| WO | 2007086916 A2 | 8/2007 |

OTHER PUBLICATIONS

Shaoquing Ren, et al., "Faster R-CNN: Towards real-time object detection with region proposal networks." Advances in neural information processing systems, 28 (2015): 91-99, 10pp.

(Continued)

*Primary Examiner* — Van D Huynh
(74) *Attorney, Agent, or Firm* — HAUPTMAN HAM, LLP

(57) ABSTRACT

A peak label object detection system (PLODS) includes an object size database configured to store information related to object size for a plurality of objects. The PLODS further includes a three-dimensional (3D) sensor database configured to store information related to parameters of a 3D sensor. The PLODS further includes an annotation database configured to store ground truth annotation information for images. The PLODS further includes a peak shape parameter calculator configured to determine a peak label size based on object size from the object size database and the parameters of the 3D sensor. The PLODS further includes a label generator configured to generate a peak labels map based on label size and the ground truth annotation information.

20 Claims, 20 Drawing Sheets

(56) References Cited

U.S. PATENT DOCUMENTS

| | | | |
|---|---|---|---|
| 2020/0272854 A1* | 8/2020 | Caesar | G06N 3/045 |
| 2021/0018595 A1* | 1/2021 | McFadden | G01S 13/887 |
| 2021/0063578 A1* | 3/2021 | Wekel | G01S 17/894 |
| 2023/0049567 A1* | 2/2023 | Popov | G06N 7/01 |
| 2023/0316789 A1* | 10/2023 | Tsafrir | G06V 20/70 |
| | | | 382/100 |

OTHER PUBLICATIONS

Scipy.signal.find_peaks- SciPy v1.7.1 Manual, https://docs.scipy.org/doc/scipy/reference/generated/scipy.signal.find_peaks.html, 3pp.

* cited by examiner

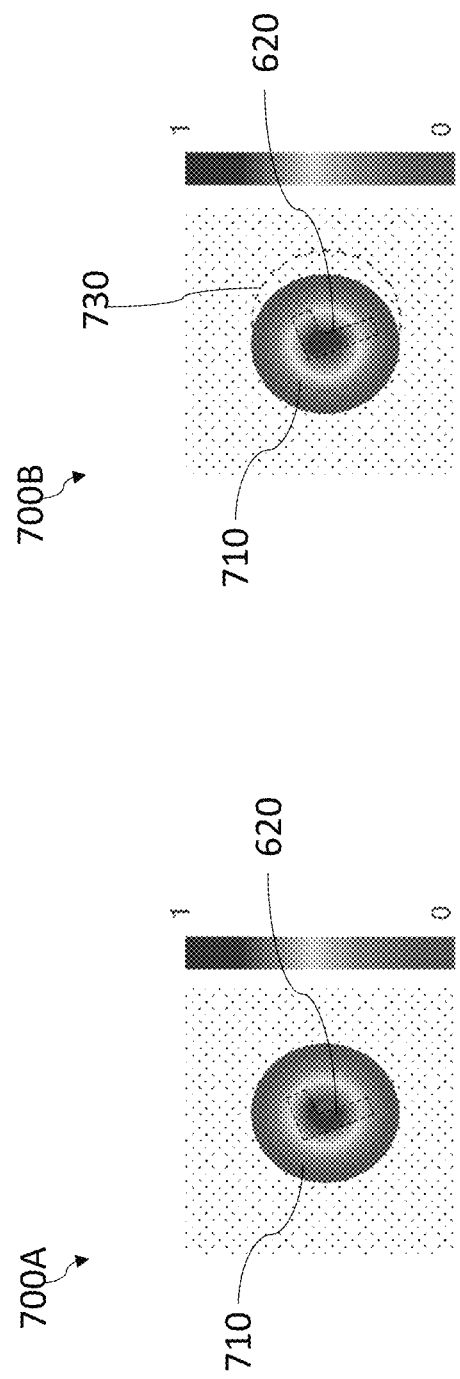

PEAK LABEL OBJECT DETECTION SYSTEM AND METHOD OF USING

BACKGROUND

Machine-learning-based detection, specifically fully or semi-supervised approaches, are usable to detect objects. Object detection methods detect the presence of objects and output a position of the object. Usually, object detector ground truth position information is in the form of a rectangular bounding box having a center positioned at a center of the object. A prediction regarding the presence and type of the object is made in the form of bounding boxes. During a training phase, the object detector ground truth object position information is utilized by a neural network to learn object features. The object detector makes object position predictions in the form of bounding box and then updates neural network weights based on an amount of overlap between the ground truth and the predicted bounding box. Predicted bounding boxes with high overlap are learned as objects whereas the predicted bounding boxes with low overlap are learned as non-objects. Once training is completed, the trained neural network is used to propose bounding boxes where objects are likely to be present. In some instances, this approach is called a region proposal. The accuracy of the object detector depends heavily on the quality of ground truth bounding box used in the detection process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 7A and 7B are views of peak label alignments in accordance with some embodiments.

DETAILED DESCRIPTION

Figure 1:
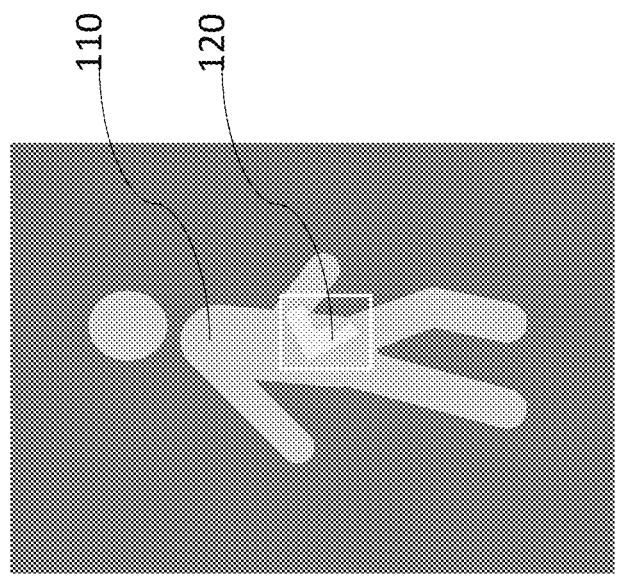
FIG. 1 is a diagram of an object carried by a target in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Peak label object detection (PLOD) systems are usable to detect objects, including concealed, partially concealed and visible objects. The PLOD system includes an object detection system for images captured using three-dimensional (3D) sensors having low resolution, such as 3D RADAR arrays. In such systems, radio waves are scattered an object. The scattered waves are measured and imaged, generating a 3D RADAR image of the object under scan. The image is usable by an object detection module to check for types of objects, such as concealed object, prohibited objects, etc. The object detection module includes a machine learning neural network that is trained using a fully or semi-supervised approach with position ground truth information of the object. The RADAR images are usually of lower resolution compared to optical images and hence labeling or annotation more challenging than for higher resolution images. Thus, other approaches for generating the ground truth position information have reduced accuracy. In the face of such inaccuracy in object position, training the object detector using the bounding box ground truth labels from other approaches adversely affects the performance of the object detection.

This disclosure provides an object detection approach for low resolution images which is able to compensate for ground truth position inaccuracies. To implement such an approach, a peak detector approach is used where a fully or semi supervised segmentor network is trained to output a peak shape whenever an object is present in a captured image. The peak shape is the probabilistic prediction of a location of the object, the probability of a presence of the object being highest at the peak. A peak detector is then able to be employed to convert the segmentor output to the detection output. To train the segmentor a peak label generator is used to generate a training target label map. The peak label generator captures inaccuracies in object position while generating peaks labels for training. In particular, the present disclosure relates to a peak label object detection system (PLODS) to detect objects in low resolution images in the face of inaccuracy in object position. While the discussion in the current application focuses on RADAR detection, one of ordinary skill in the art would recognize that this disclosure is not limited solely to RADAR and that other sensor types, such as SONAR, LIDAR, thermal imaging, etc., are within the scope of this disclosure.

In some embodiments, this system detects a concealed object when a person walks through a detection area. In some embodiments, this system is usable to detect concealed items that are prohibited or dangerous, such as a weapon. This system is usable for building security, airport security, or other suitable situations. The following description focuses on a person as a target and a concealed weapon as an object to be detected. However, one of ordinary skill in the art would understand that this disclosure is not limited to this example. For example, in some embodiments, the target includes baggage, a vehicle, or other structure capable of supporting an object to be detected. In some embodiments, the object includes something other than a weapon such as a cigarette lighter, a container, an electronic device, or other suitable objects. The system is also described as being directed to a moving target. However, in some embodiments, the system is usable with a stationary target.

The system detects the target as the target is walking through a detection area. The detection is performed using a RADAR emitter and an array of receiving antennas located inside a RADAR detector. The emitter sends a RADAR signal towards the target, the signal is scattered by the target and the reflected signal is acquired by the receiving antennas. The RADAR signal is processed based on the received signal and the characteristics of the antenna array to generate a 3D image. A concealed dangerous object, such as a weapon, carried by the target generates a characteristic signature in the 3D RADAR image. The RADAR image is usable for concealed weapon detection. To detect the presence of a weapon in the 3D RADAR image, an object detection module is utilized. The system is able to function in real-time as to obtain presence/absence information of concealed objects while the target is walking through the detection area. The object detection module includes a machine learning neural network. Training the machine learning neural network for high accuracy is challenging because the resolution of 3D RADAR images are very low in comparison with other types of images. As a result, making ground truth annotation for the 3D RADAR images is challenging. In addition to resulting in inaccurate labels, the annotation process also becomes time-consuming as precise and tight bounding boxes are used around fuzzy three-dimensional objects.

In the face of such inaccuracies in object position, training the object detector using the bounding box ground truth labels adversely affects the accuracy of other approaches. Predicted bounding boxes with low overlap are learned as non-objects whereas the predicted bounding boxes with high overlap are learned as object. Hence, inaccuracies in the predicted bounding box location of labels result in significant errors when training the machine learning neural network. This is reflected in the prediction phase with lower detection accuracy.

A bounding box is an example of a "hard" label where the probability of an object being inside the bounding box is 1 and outside is 0. In the case of RADAR images, a "soft" labeling approach is more suitable for accurate detection because of the lower quality of the images. Instead of a bounding box, a probabilistic label is proposed whose values decreases gradually from 1 to 0. This "soft" label is modeled as a peak-shape function, hence the name "peak label". Examples of peak-shape functions include Gaussian or Lorentzian functions. The probability of an object being near a peak is highest and the probability decreases smoothly as one moves away from the peak. Such labels are more suitable to model the position of objects in low-resolution images such as 3D RADAR images where instead of generating binary target maps with hard boundaries, the models generate smooth density maps. The size or extent of peak labels are based on a size of the corresponding object.

Since the peak labels are in the form of density maps, in some embodiments, the neural-network architecture is a fully-convolutional neural network. This class of neural networks takes as input an image and outputs a similarly-sized density map and is sometimes referred-to as segmentation models (or segmentors). The prediction of a segmentor, which is a peak shape density map, is then passed to a peak detector module for detecting presence of objects and their position and size. The disclosed system is able to provide a peak-label object detection system (PLODS) to detect objects in low resolution images despite inaccuracy in object position.

A PLOD system (PLODS) includes the following subsystems: a peak label generator subsystem, a training subsystem and a detection subsystem. The peak label generator subsystem of PLODS includes an object size storage to provide object size, a 3D sensor parameter storage to provide sensor information, an annotation storage to provide annotations, a peak shape parameter calculator to decide peak label size, and a label generator to generate target maps of peak labels. The training subsystem of PLODS includes a peak label storage to provide labels, an image storage to provide images and a segmentor to be trained for object detection. The detection subsystem of PLODS includes the image database to provide data source, a trained segmentor to predict peak density map, and a peak detector to convert the output density map of the segmentor to object locations by finding peaks.

The peak labels are capable of having different shapes. The peak label shape is decided before the processing starts, usually based on shape and/or size of object-of-interest, i.e., the object sought by the detection system. The peak shape parameter calculator sets the parameter of the peak shape function to an appropriate value to control the peak label size and orientation. In some embodiments, in case of multidimensional peak labels, the size and orientation differ in some dimensions. Although the position, size and orientation of the label should roughly correspond to the object boundary, a precise marking is less critical due to the fuzzy nature of the peak shape function that generates the target map from object labels in comparison with tight bounding boxes used in other approaches. Hence the annotation of labels is able to proceed faster and more efficiently by estimating size and/or orientation than other approaches.

The PLODS is able to improve object detection performance due to learning through a segmentor network using peak labels which absorb inaccuracies in object position. This improvement is achieved at least in part due to the soft nature of the peak labels which provide a probabilistic position of the object, the probability of the object being closer to the peak is highest and smoothly decreases as one moves away from the peak. This representation helps absorb inaccuracy in an actual position, size and orientation of the object without affecting performance adversely. Such absorption of small errors does not occur in the case of hard bounding box labels as the hard bounding box approach implies that object is exactly at the box's center location. Moreover, an additional effect is reduced effort and time of labeling since the system is able to use only the center and rough orientation of objects and not tight bounding boxes.

A non-limiting sample operation of the PLODS is described as a way of introduction. The detection subsystem is described with reference to a concealed weapon detection system. In the concealed weapon detection system, the 3D RADAR image is acquired and used as detection input and the object-of-interest is the concealed weapon. The target is walking in the detection area, in front of the fixed RADAR antenna. The measured scattered RADAR signal is sent for imaging. The captured RADAR image, 3D in nature, is the input to a detection subsystem that infers whether the target carries any weapon or not. The detection subsystem includes a segmentor block and peaks detector block. The segmentor block, which is a machine learning network, is trained to output a peak shape at the position where a weapon is detected. In some embodiments, the peak shape is 3D or 2D depending on type of network being employed. The peaks detector block detects the presence of peak shape in the segmentor output and infers whether weapons are present. In some embodiments, the peaks detector block is implemented by a simple peak detection function available in libraries, such as scipy.

Next, the peak label generator subsystem and training subsystem are explained to provide a non-limiting example for how the segmentor is trained. The final accuracy of the trained segmentor is dependent upon the quality of the data, e.g., 3D RADAR images and associated label maps, used to train the segmentor. During its operation, the 3D RADAR images are measured as explained, stored in a database (DB) and read one by one from the database. Also, the annotation information specifying the weapon type and position is stored in a separate DB. In some embodiments, the annotation is obtained through manual or automatic, e.g., algorithmic, machine learning, etc., means. Specifically, the labeling here refers to annotating the center position of the object and the object type/class. Image identification information is also stored as part of the annotation to link labels with their corresponding image.

Information about the actual sizes, e.g., in millimeters (mm) or other suitable units, of weapons of interest as well as the characteristics of the RADAR sensor are stored in a DB. In the peak label generator subsystem, the peak shape parameter calculator decides the peak label size based on the weapon type, weapon size and RADAR information such as resolution, voxel size, etc. The label size is the measure of the size or extent of the generated peak label. For example, in a situation where the label is a Gaussian function then the label size is able to be interpreted as the variance in the label size. The orientation of the label is also obtainable manually or automatically or fixed to the general axis. The label generator generates a peak label map based on the received position, size and orientation of one or more labels (or no label in case no weapons are detected). Once the peak label maps have been generated, the peak label maps are stored in a database. In the training subsystem, the segmentor is trained using a set of RADAR images with corresponding label maps fetched from the database. Once training is finished, the trained segmentor is usable for object detection in the PLODS.

A configuration of a PLODS in accordance with the first embodiment of the present disclosure will be explained next. Specifically, the peak label generator subsystem will be explained below in FIG. 9. The output of this subsystem is a generated peak labels which can be used for training the segmentor in training subsystem.

FIG. 1 is a diagram 100 of an object carried by a target in accordance with some embodiments. The diagram 100 includes a target 110 carrying an object 120. In some embodiments, the target 110 is a person. In some embodiments, the target 110 is baggage, such as luggage, a vehicle, or other suitable structure capable of carrying an object. The object 120 is a weapon, in diagram 100 a gun. In some embodiments, the object 120 is a different type of weapon, such as a knife, a club or another type of weapon. In some embodiments, the object 120 is not a weapon, but is a different type of prohibited item, such as a container, a cigarette lighter, or another type of prohibited item. In some embodiments, the object 120 is a different type of object, such as an electronic device, e.g., a mobile phone, a recording device, or another type of electronic device.

FIG. 2A is a perspective view 200A of a target 110 passing through a detection area 220 in accordance with some embodiments. The perspective view 200A includes a RADAR detector 210 including a plurality of RADAR antenna 212. The RADAR antenna 212 are arranged in a two-dimensional array in the RADAR detector 210. The RADAR detector 210 is configured to emit radio waves and detect scattered waves using the plurality of RADAR antenna 212. The RADAR detector 210 is configured to detect target 110 and object carried by the target 110 within the detection area 220. The RADAR detector 210 is stationary. In some embodiments, the RADAR detector 210 is movable. In some embodiments, the RADAR detector 210 is configured to move in a walking direction of the target 110. In some embodiments, the RADAR detector 210 is configured to move around the target 110. In some embodiments, the RADAR detector 210 is positioned above the target 110.

FIG. 2B is a top view 200B of a target 110 passing through a detection area (not labeled) in accordance with some embodiments. The top view 200B is similar to the perspective view 200A (FIG. 2A). The top view 200B includes a current position of the target 110 and several previous positions of the target 110' having dashed outlines. The top view 200B is usable to indicate movement of the target 110 past the RADAR detector 210.

Figure 3:
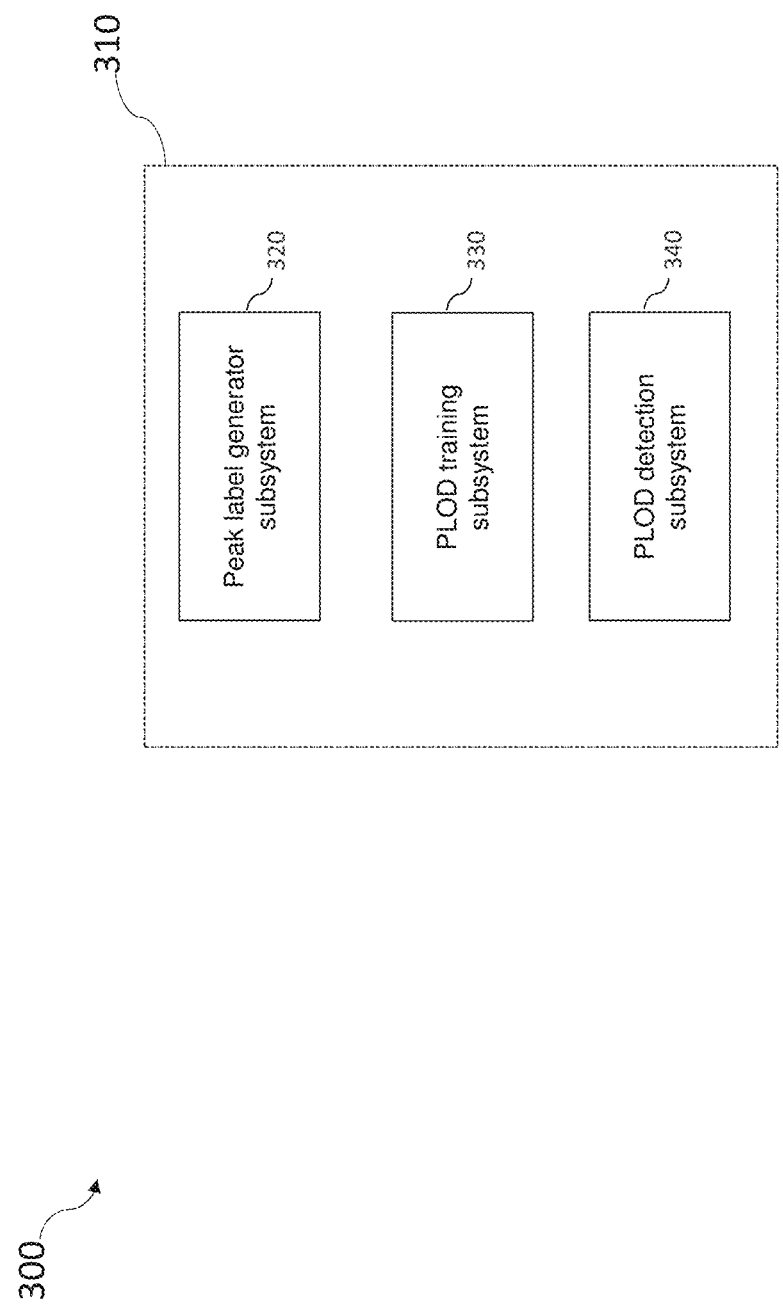
FIG. 3 is a diagram of a system for peak label object detection (PLOD) in accordance with some embodiments.

FIG. 3 is a diagram of a peak label object detection system (PLODS) 300 in accordance with some embodiments. The PLODS 300 includes a processor 310 configured to execute instructions for implementing the functionality of the PLODS 300. In some embodiments, functionality of the PLODS 300 is separate amongst multiple processors 310.

The processor 310 includes a peak label generator subsystem 320, a PLOD training subsystem 330, and a PLOD detection subsystem 340. Details of the different subsystems according to some embodiments are described below.

Figure 4:
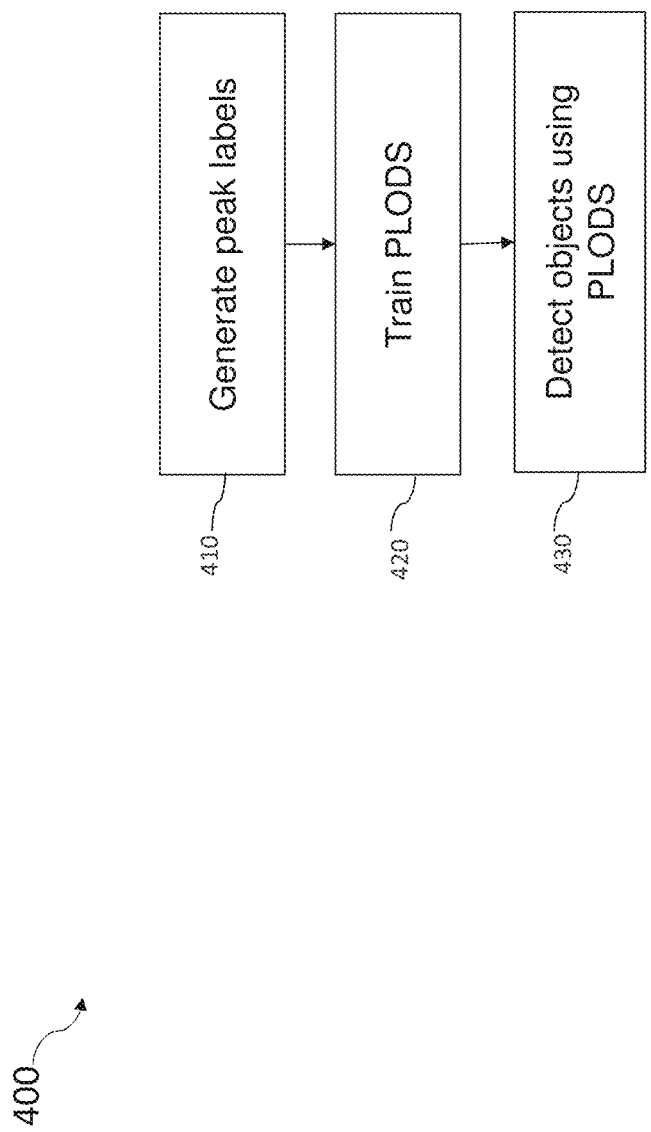
FIG. 4 is a flowchart of a method of implementing a PLODS in accordance with some embodiments.

FIG. 4 is a flowchart of a method 400 of implementing a PLODS in accordance with some embodiments. In some embodiments, the method 400 is implementable using the PLODS 300 (FIG. 3). In some embodiments, the method 400 is implemented using data from RADAR detector 210 (FIG. 2A).

In operation 410, peak labels are generated. The peak labels are generated based on a type of object being sought in the PLOD. The peak labels include probabilistic labels to be placed over one or more locations of a target to determine whether the object being sought is present. A size of each of the peak labels is set based on a size of the object being sought. In some embodiments, each of the peak labels has a same shape. In some embodiments, at least one of the peak labels has a different shape from at least one other of the peak labels. Details of the generation of peak labels is described with respect to FIG. 9 below, in accordance with some embodiments.

In operation 420, the PLODS is trained. The PLODS is trained by training a machine learning neural network to using the peak labels generated in the operation 410. In some embodiments, the machine learning neural network includes a fully-convolutional neural network. The machine learning neural network is trained using images having known objects and images known to be free of objects.

In some embodiments, operations 410 and 420 are performed a single time in the method 400. In some embodiments, at least one of operation 410 or operation 420 is repeated based on a trigger condition in order to improve the accuracy of the PLODS. In some embodiments, the trigger condition includes a period of time. That is, in some embodiments, the operation 410 and/or the operation 420 is repeated periodically. In some embodiments, the trigger condition includes an update to a database including object information. That is, in some embodiments, the operation 410 and/or the operation 420 is repeated in response to receiving new information about existing objects in the database or upon entry of new objects into the database. In some embodiments, the trigger condition includes a failure rate of the PLODS exceeding a predetermined threshold. A failure rate is determined as a rate of false positives or false negatives. In some embodiments, the predetermined threshold is set by an operator.

In operation 430, objects are detected using the PLODS. The objects are detected using the trained machine neural network from operation 420 and the peak labels generated in operation 410. A target is scanned using a RADAR detector, e.g., RADAR detector 210 (FIG. 2A), and a determination is made regarding whether the target is carrying any objects sought by the PLODS.

In some embodiments, the method 400 includes additional operations. For example, in some embodiments, the method 400 includes a notification operation to notify an operator that an object was detected on the target. In some embodiments, the notification includes an audio or visual notification. In some embodiments, the notification is configured to cause a device, such as a mobile device, accessible by the operator to automatically generate an alert in response to a determination that a target is carrying an object. One of ordinary skill in the art would recognize that other modifications to the method 400 are within the scope of this disclosure.

Figure 5C:
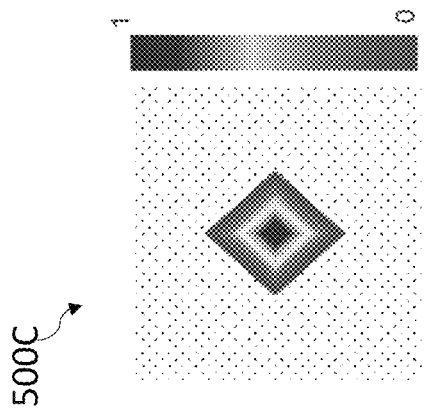
FIGS. 5A-5C are views of peak label shapes in accordance with some embodiments.
Figure 5B:
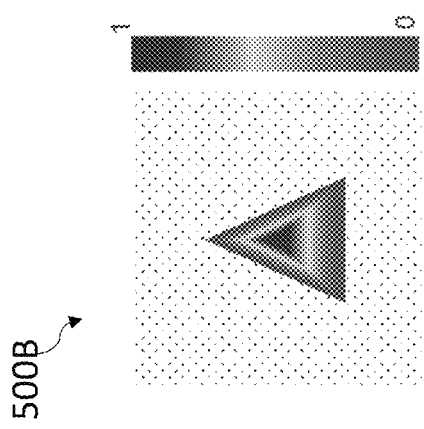
Figure 5A:
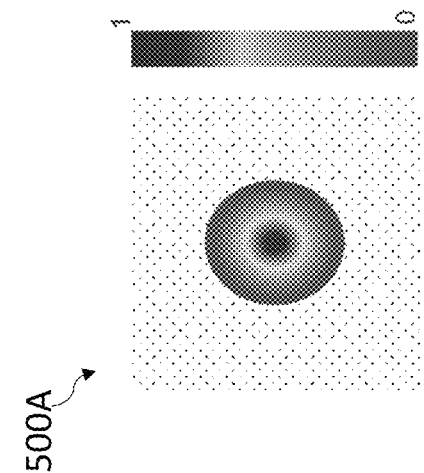

FIGS. 5A-5C are views of peak label shapes in accordance with some embodiments. In comparison with bounding boxes, which have a 0 or 1 determination for whether an object is located within the bounding box, peak label shapes have a variable value based on how close to the center an object is located. An object having a center located at the center of the peak label shape has a value of 1 and the value gradually decreases to a 0 value when a center of the object is outside of the peak label shape. This allows the peak label shapes to be usable for identifying an object that is partially within the peak label shape and partially outside the peak label shape.

FIG. 5A is a view of a peak label shape 500A having a Gaussian shape. FIG. 5B is a view of a peak label shape 500B having a triangular shape. FIG. 5C is a view of a peak label shape 500C having a diamond shape. One of ordinary skill in the art would recognize that the peak label shapes of views 500A-500C are merely examples and that other shapes, such as other polygonal or elliptical shapes are within the scope of this disclosure. In some embodiments, the peak label shapes of views 500A-500C are usable in PLODS 300 (FIG. 3) and/or in the method 400 (FIG. 4).

Figure 6B:
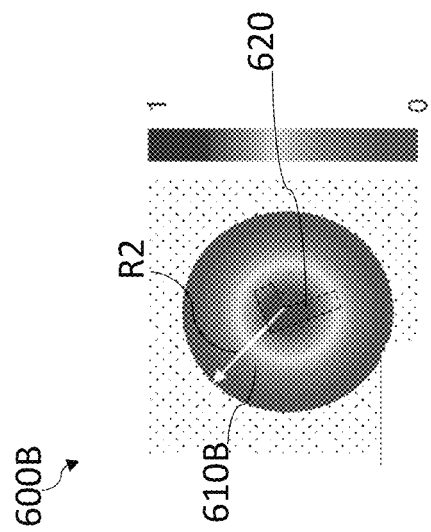
FIGS. 6A and 6B are views of peak label sizes in accordance with some embodiments.
Figure 6A:
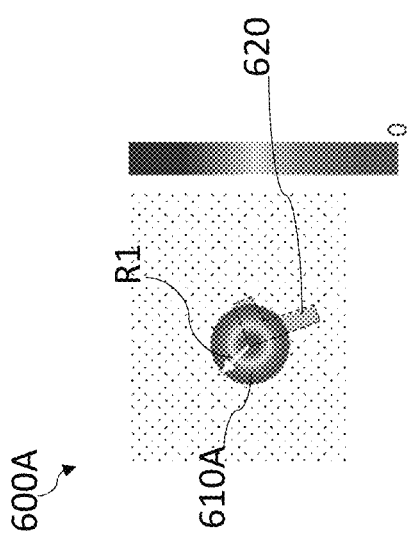

FIGS. 6A and 6B are views of peak label sizes in accordance with some embodiments. Having a peak label that closely matches a size of an object sought helps to both provide increased accuracy over other approaches and minimizes computational load on the PLODS.

FIG. 6A is a view 600A of a peak label 610A that is smaller than an object 620. While the object 620 is within the peak label 610A and is likely to be detected by the PLODS, e.g., the PLODS 300 (FIG. 3), a likelihood of accurate prediction of the type of object 620 is reduced because so much of the object 620 is outside of the bounds of the peak label 610A. The peak label 610A has a radius R1 that is less than a largest dimension of the object 620. As a result, the likelihood that an entirety of the object 620 would be located entirely within the peak label 610A is small.

FIG. 6B is a view 600B of a peak label 610B that is significantly larger than the object 620. The larger peak label 610B means that the object 620 is likely to be within the peak label 610B; however, the size of the peak label 610B also impacts the amount of a computational load on the PLODS, e.g., PLODS 300 (FIG. 3). A larger computational load means that results from the PLODS are provided more slowly and/or that fewer analysis are able to be performed by the PLODS in parallel, which reduces a number of total comparisons that the PLODS is able to perform within any given time period. The peak label 610B has a radius R2 that is significantly longer than the longest dimension of the object 620.

In some embodiments, a radius of the peak label should be approximately equal to a longest dimension of the object 620. This helps to ensure that the object 620 is likely to be within the peak label; and also helps to avoid unnecessary increase in computational load on the PLODS. The peak labels 610A and 610B are Gaussian. In some embodiments, the peak labels have a different shape and a distance from a center of the peak label to an outer edge of the peak label is set to be approximately equal to the longest dimension of the object. By knowing what object or objects is sought by the PLODS, a size of the peak label is able to selectively determined in order maximize accuracy of the PLODS and minimize computational load on the PLODS.

FIGS. 7A and 7B are views of peak label alignments in accordance with some embodiments. Selecting a location for the peak label at a position where the object 620 is likely to be located helps to increase the likelihood of the object 620 being within the peak label. FIG. 7A is a view 700A of a peak label 710 having a center aligned with a center of the object 620. This alignment is highly likely to produce an accurate identification of the object 620 and a type of the object 620. FIG. 7B is a view 700B of the peak label 710 having a center that is offset from the center of the object 620. The dashed outline 730 indicates a location where the peak label would have a center aligned with the object 620. The view 700B would still have a high likelihood of detecting the object 620; however, the odds of detection are slightly lower than for view 700A. Still, the use of peak label 710 provides improved accuracy over the approach of bounding boxes.

Figure 8:
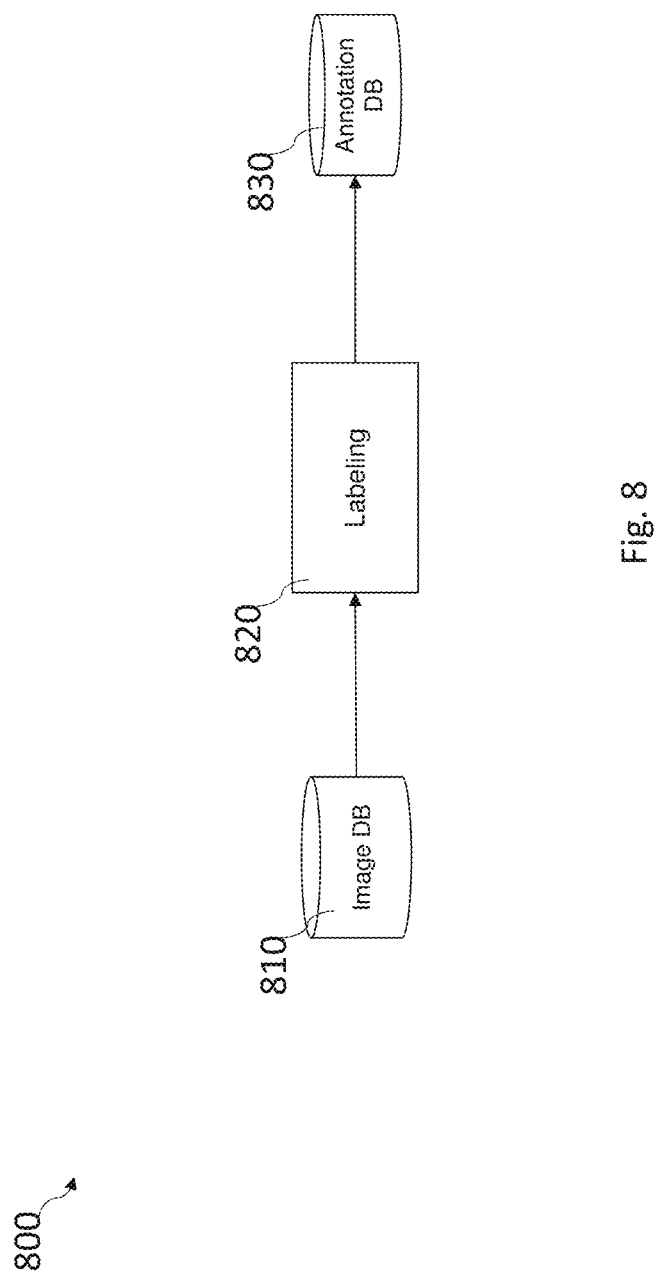
FIG. 8 is a functional diagram of an image annotation subsystem in accordance with some embodiments.
Figure 9:
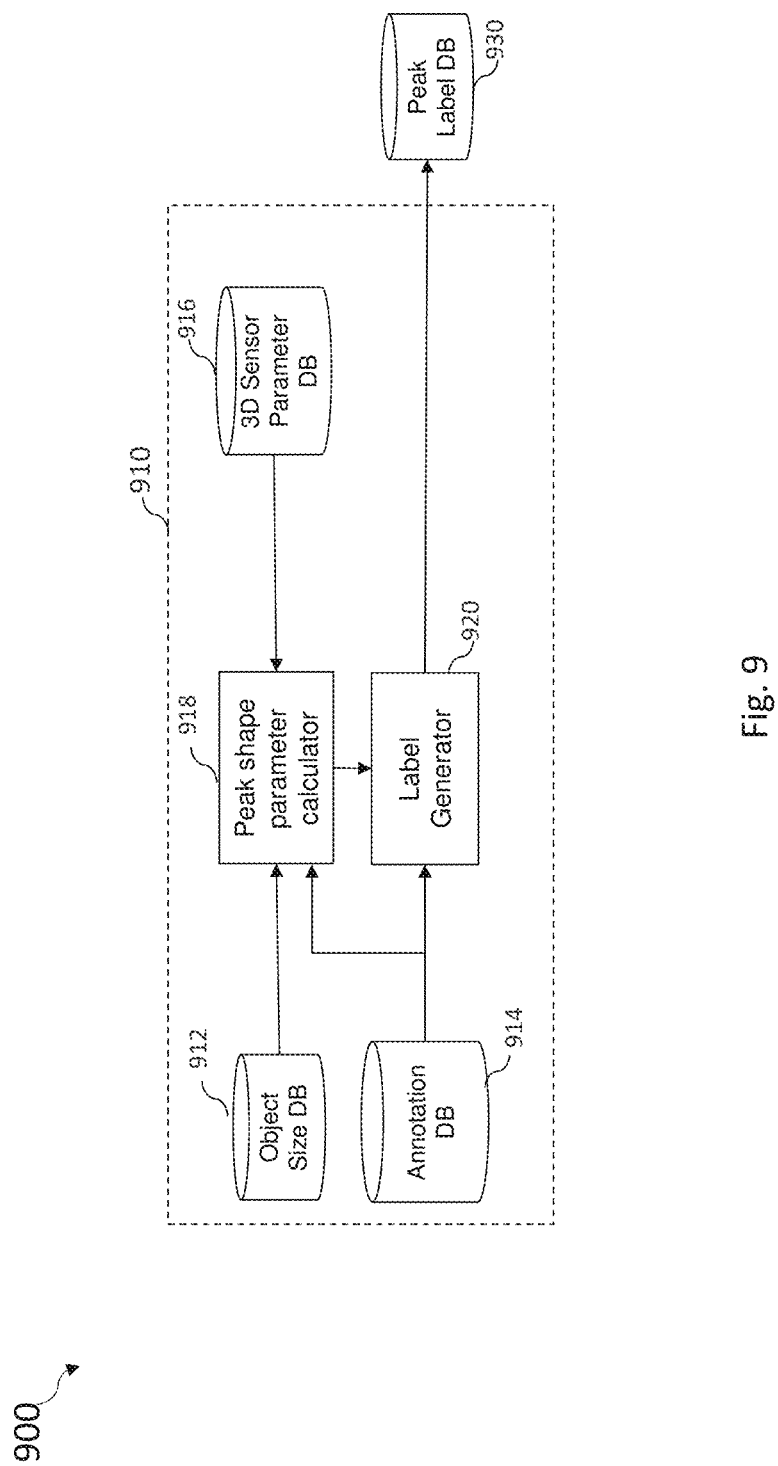
FIG. 9 is a functional diagram of a peak label generator subsystem in accordance with some embodiments.

FIG. 8 is a functional diagram of an image annotation subsystem 800 in accordance with some embodiments. The image annotation subsystem 800 includes an image DB 810 that contains images from a sensor used in a PLODS, e.g. PLODS 300 (FIG. 3). The image annotation subsystem 800 includes a labeling element 820 implemented using a processor. The labeling element 820 is configured to label objects withing the images in the image DB 810. In some embodiments, the labeling is implemented manually. In some embodiments, the labeling is implemented using a partially or fully trained neural network. The labeled images are stored in an annotation DB 830 using in the PLODS. In some embodiments, the annotation DB 830 is usable as annotation DB 914 (FIG. 9). In some embodiments, the annotation subsystem 800 includes additional hardware, such as an input/output (I/O) device configured to receive input from an operator for labelling purposes or to confirm labelling by a partially or fully trained neural network.

FIG. 9 is a functional diagram of a peak label generator subsystem 900 in accordance with some embodiments. In some embodiments, the peak label generator subsystem 900 is usable as the peak label generator subsystem 320 of the PLODS 300 (FIG. 3). In some embodiments, the peak label generator subsystem 900 is usable to implement operation 410 of the method 400 (FIG. 4). The peak label generator subsystem 900 includes an object size database (DB) 912, a 3D sensor parameter DB 916, a peak shape parameter calculator 918, a label generator 920, and an annotation DB 914.

The object size DB 912 contains the size of objects of interest. The size of an object includes all relevant dimensions, e.g. height, width, depth, etc., measured in real-world units, e.g., inches (in), centimeters (cm) or other suitable units. In some embodiments, the object type or name information acts as the primary key while probing the DB. In some embodiments, an example of an object size DB content is provided in the form of a table in FIG. 10.

Figure 10:
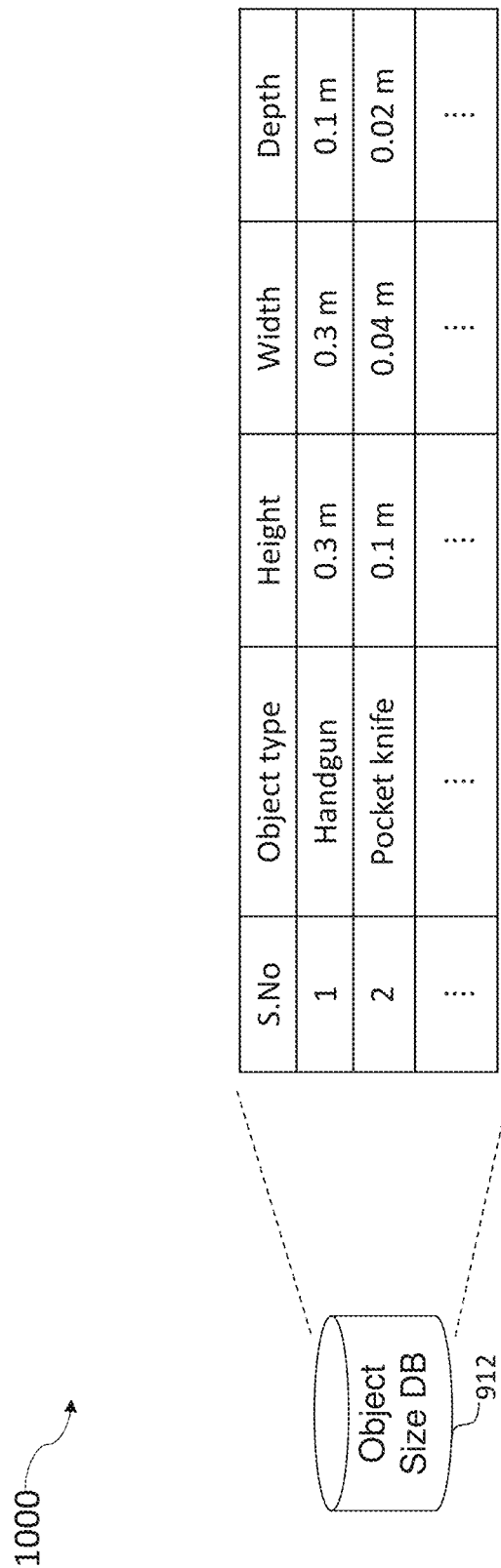
FIG. 10 is a view of an object size database in accordance with some embodiments.

FIG. 10 is a view of an object size database 1000 in accordance with some embodiments. As shown in the example table, each row of the table belongs to one object. The contents of each row includes the object type and object dimensions, such as height, width and depth. The primary key or identifier is the object type with which the corresponding dimensions are able to be retrieved. One of ordinary skill in the art would understand that the objects are merely exemplary and that other objects are within the scope of this description. Further, one of ordinary skill in the art would recognize that the size of the objects in the example table are merely exemplary and that object types having different dimensions are also within the scope of this description.

Returning to FIG. 9, the 3D sensor parameter DB 916 stores information, such as specifications or characteristics, about the sensor used to capture the images. In some embodiments, types of 3D sensors include RADAR, LIDAR, MRI, depth camera, infrared camera, etc. The 3D sensor parameter information assists in calculating a size of an object in the image captured by the 3D sensor by accounting for a size of the sensor, scaling factors, measurement error/uncertainty factors, etc.

In case the 3D sensor is a RADAR device, then the sensor parameter information includes spatial resolution, range resolution, voxel size along x-dimension, voxel size along y-dimension, etc. In some embodiments, 3D sensor parameter DB content for RADAR sensor is shown in the form of a table in FIG. 11.

Figure 11:
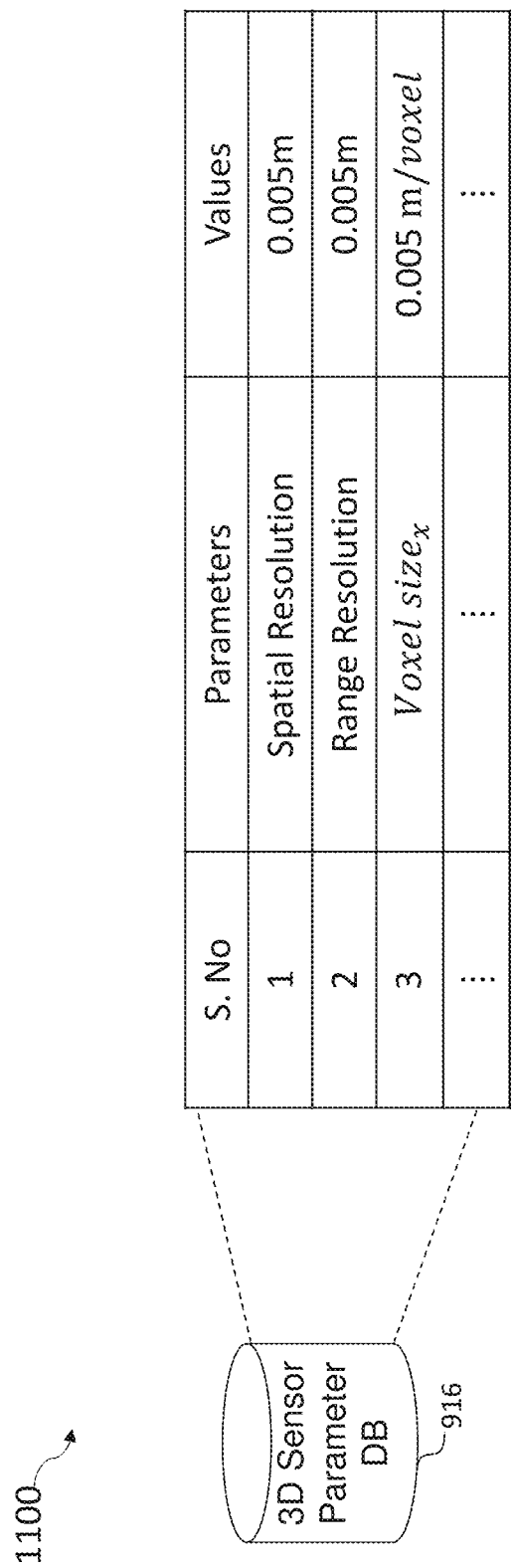
FIG. 11 is a view of a three-dimensional parameter database in accordance with some embodiments.

FIG. 11 is a view of a three-dimensional parameter database 1100 in accordance with some embodiments. The values of the spatial resolution, range resolution and voxel size along x-dimension are stored, amongst other parameters. One of ordinary skill in the art would understand that the parameters are merely exemplary and that other parameters are within the scope of this description. Further, one of ordinary skill in the art would recognize that the values of the parameters in the example table are merely exemplary and that parameters having different values are also within the scope of this description.

Figure 12:
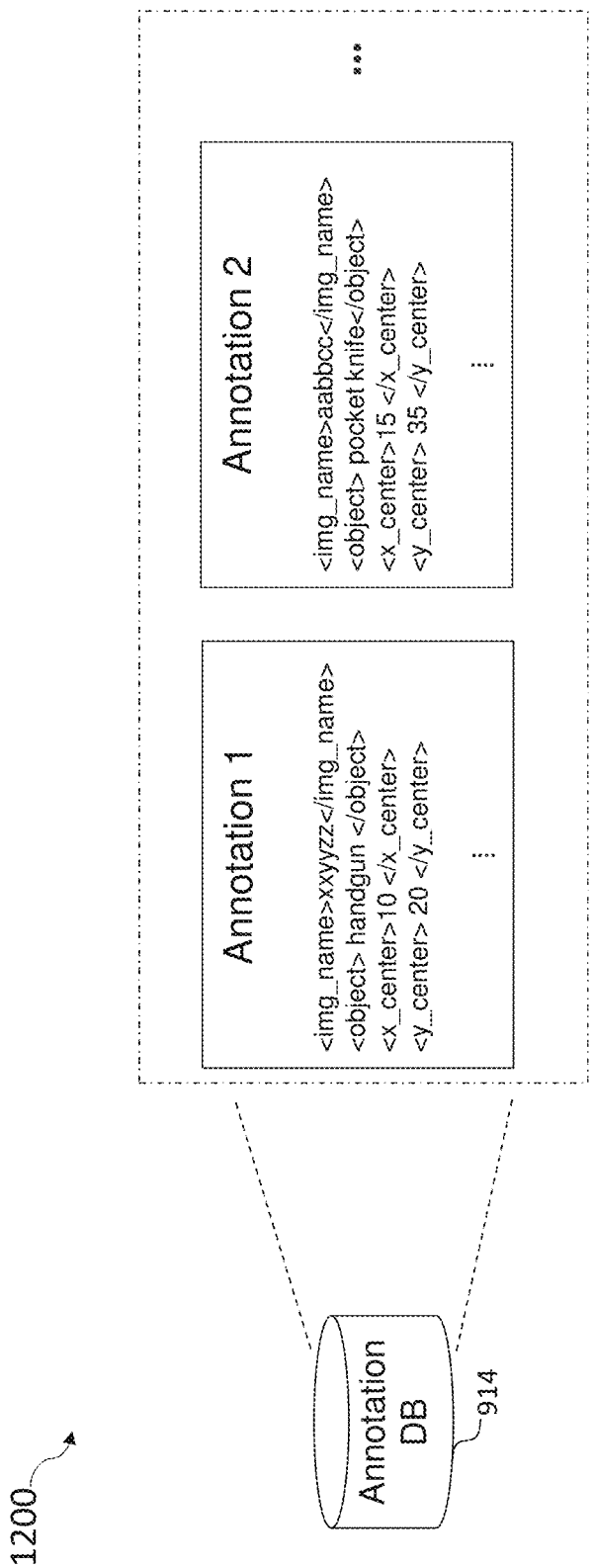
FIG. 12 is a view of an annotation database in accordance with some embodiments.

Returning to FIG. 9, the annotation DB 914 stores the ground truth information about objects. In some embodiments, the ground truth information is inputted by a human labeler. In some embodiments, the ground truth information is generated by a partially or fully trained neural network. In some embodiments, the annotation DB 914 is generated using the system 800 (FIG. 8). In some embodiments, the stored information includes object type, object position, object orientation, etc. In some embodiments, annotation DB content is shown in FIG. 12, where an object type/name and center position, given by x, y and z coordinates, are stored and linked by tags. Additionally, the ID of the image, e.g., a name, identification number, etc., is stored in one of the tags. This ID will be used to tag generated peak label maps so that the peak labels are able to be linked with a corresponding image during a training process.

FIG. 12 is a view of an annotation database 1200 in accordance with some embodiments. Each annotation corresponds to a different object type. Each annotation includes an estimated center location of the object type within the image. One of ordinary skill in the art would understand that the information stored with respect to each annotation is merely exemplary and that other information is within the scope of this description. Further, one of ordinary skill in the art would recognize that the center positions of the object types in the example table are merely exemplary and that the same object type having different center positions are also within the scope of this description.

Returning to FIG. 9, the peak shape parameter calculator 918 calculates the size of peak shape labels based on object type from annotation DB 914, real-world object size from object size DB 912 and 3D sensor parameter information from 3D sensor DB 916. The peak shape parameter calculator 918 outputs the calculated size of labels to the label generator 930. The peak shape parameter calculator 918 retrieves the list of objects annotated from annotation DB 914. Based on the type of each object, a real-world size of the corresponding object is queried from object Size DB 912. Using 3D sensor parameter DB 916, the real-world size of an object is transformed into an image label size. One of ordinary skill in the art would understand that image label size is a multidimensional vector. The term label size is further clarified by the following examples. The label size controls the span or extent of the peak label. If the peak label is in 3D then the label size controls a volume of the peak label. In case of a more specific example of 3D Gaussian shaped peak label, the label size and variance are used synonymously. One of ordinary skill in the art would understand that the variance or the label size includes different values for any or all of x, y and z dimensions.

The utilization of the 3D sensor information is explained with the help of the example parameters. In the case of 3D sensors like RADAR or LIDAR or MRI, the object size in the image is proportional to the real-world size. This is unlike the optical camera case, where the object size in the image depends on the distance from the sensor. The proportionality factor in the case of 3D sensors is the voxel size. An explanation of voxel size is provided with respect to FIG. 13.

Figure 13:
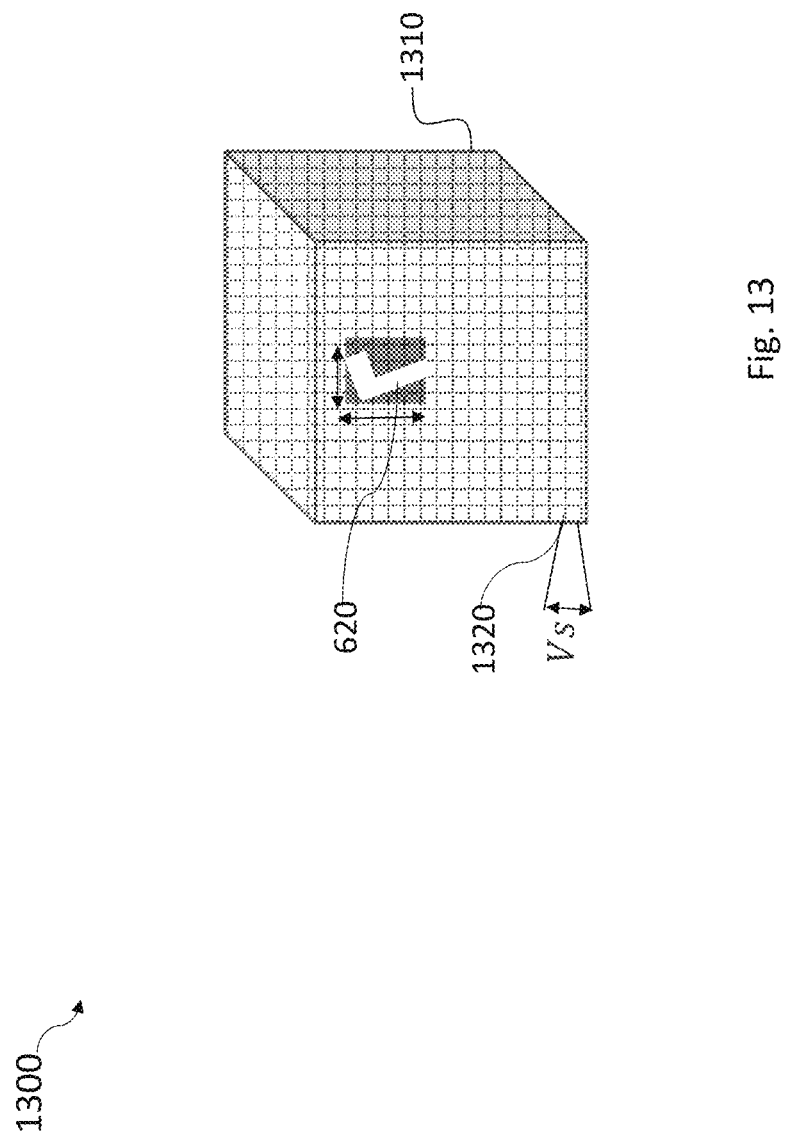
FIG. 13 is a perspective view of a three-dimensional image including an object in accordance with some embodiments.

FIG. 13 is a perspective view 1300 of a three-dimensional image 1310 including an object in accordance with some embodiments. The three-dimensional image 1310 includes a three-dimensional array of three-dimensional units 1320. Each of the three-dimensional units 1320 is called a voxel. In the three-dimensional image 1310, each voxel 1320 has a voxel size Vs. In the three-dimensional image 1310, each of the voxels 1320 is a cube. In some embodiments, the voxels 1320 have different shapes or dimensions. The object 620 spans in three dimensions across the voxels 1320, which allows capturing the real world proportional size of the object based on a comparison using a size of the voxels 1320.

Returning to FIG. 9, in this case the voxel size is one of the sensor information used to convert an object size from real-world units to corresponding dimensions in the image. In some embodiments, the voxel size is equal along all axes, and the label size is equal along all axes. In some embodiments, the voxel size is different along different axes, likewise the label size will differ along different axes. In some embodiments, the relation between label size, object size and voxel step size is determined using the following Equation 1:

$$\text{Label size} = A = g(\text{voxel size}) = \frac{\text{object size (m)}}{\text{voxel size (m/voxel)}} \quad \text{Equation 1}$$

In some embodiments, capturing the position uncertainty in the generated label is desired because more certainty leads to tighter label boundary which improves accuracy of object detection. For this purpose the resolution information from the 3D sensor parameter DB 916 is utilized. When the resolution is higher, there is higher certainty of the position information. In this case, the label size is determined by an additional factor B=h (resolution), which is a function of a resolution of the 3D sensor. Similar to voxel size, in some embodiments, the resolution differs along each dimension or axes. In some embodiments, the resolution is equal along each dimension or axes. Thus, the label size in each dimension is a function of both voxel step and resolution, here the function k(.) converts the input B units to voxels using the voxel size parameter of Equation 2:

Label size=$A+B=g$(voxel size)+$k$(voxel size,$h$(resolution)) Equation 2

Figure 2:
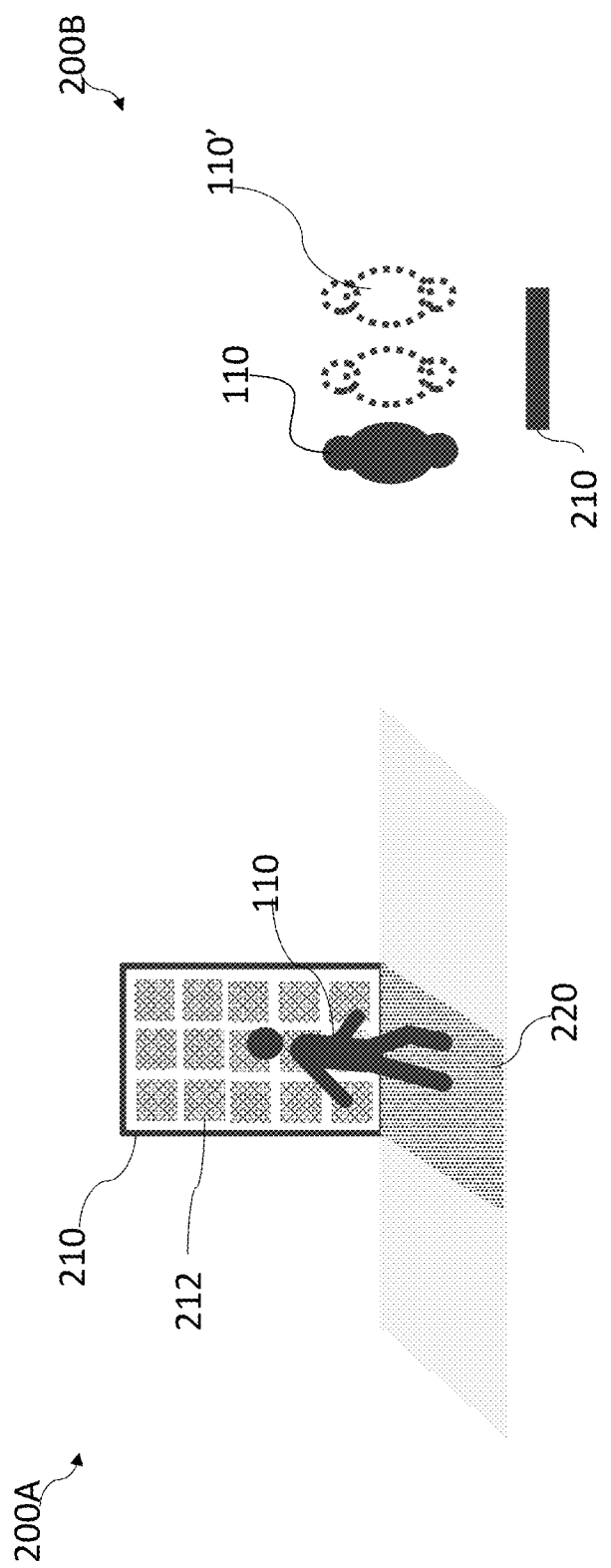
FIG. 2A is a perspective view of a target passing through a detection area in accordance with some embodiments.
FIG. 2B is a top view of a target passing through a detection area in accordance with some embodiments.

For the setup of RADAR sensors as shown in FIG. 2, the resolution is able to be expressed as spatial resolution along x-dimension $\delta_x$, along y-dimension $\delta_y$ by using Equation 3 and range resolution along z-direction $\delta_z$ in Equation 4:

$$\delta_x = \delta_y = \frac{c}{4f_{max}} \sqrt{4\left(\frac{L}{D}\right)^2 + 1} \quad \text{Equation 3}$$

$$\delta_z = \frac{c/2}{\Delta f + f_{min}\left(1 - \frac{1}{\sqrt{1 + 0.5(D/L)^2}}\right)} \quad \text{Equation 4}$$

Figure 14:
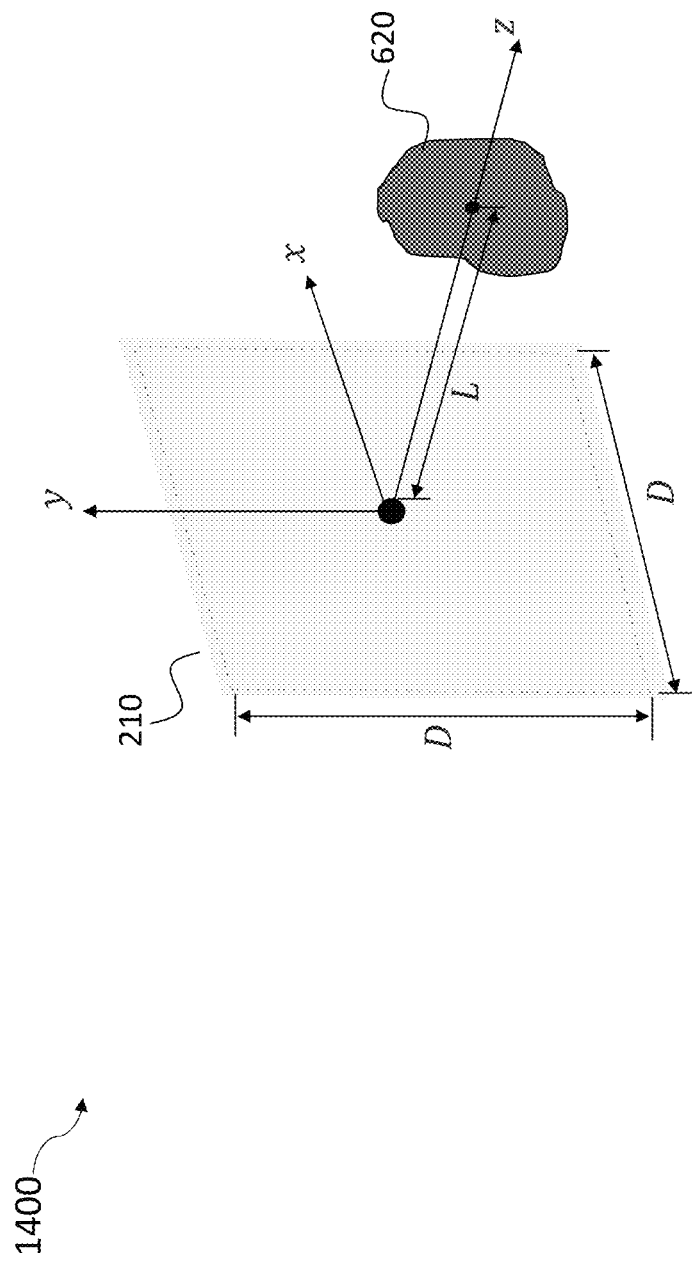
FIG. 14 is a perspective view of a detector system in accordance with some embodiments.

Here c is the speed of light, $f_{max}$ and $f_{min}$ are maximum and minimum frequency of operation respectively, $\Delta f$ is the frequency bandwidth, D is the side length of the square aperture of the planar array and L is the perpendicular distance of the object from the planar array as shown in FIG. 14.

FIG. 14 is a perspective view of a detector system 1400 in accordance with some embodiments. The detector system 1400 includes the RADAR detector 210. Details of the RADAR detector 210 are not discussed with respect to FIG. 14 for the sake of brevity. The detector system 1400 includes an object 620 to be detected. The RADAR detector 210 is a square having side lengths D. In some embodiments, the RADAR detector 210 is a different shape than square or one side length D is different from another side length. The object 620 is located a distance L from the RADAR detector 210. The distance L is measured in a z-direction perpendicular to the surface of the RADAR detector 210.

Returning to FIG. 9, thus, the RADAR sensor spatial resolution depends on the size of aperture, maximum frequency, and distance of the object from the sensor. Likewise, the RADAR sensor's range resolution depends on frequency bandwidth, minimum frequency, size of aperture and distance of object from the sensor. One of ordinary skill in the art would understand that further sensor parameter information is also able to be utilized in to enhance the accuracy.

The label generator 920 generates the peak label map based on label information from the peak shape parameter calculator 918 and annotation information from the annotation DB 914 and outputs a map of peak labels. The peak labels have a peak/high value, e.g. 1, at a center point and the value around the peak point falls gradually to a low value, e.g. 0, on all sides. The rate of fall of value depends on the peak label size received from the peak shape parameter calculator 918. The center points of the peaks are given by the annotation information. In some simplified embodiments, the peak labels are generated using only the information from the annotation DB 914 using a fixed peak label size for all objects, specifying peak label size in annotation information, etc. In some embodiments, there are zero, one or more objects present in an image, so, in some embodiments, there are zero, one or more peaks present in the generated peak labels map. Moreover, in some embodiments those objects belong to different types and hence label size also differ for each of object. If the annotation information specifies that there is no object present, then the label generator 920 outputs an empty label map including only null or low values, e.g. 0s. This happens in case of so-called "negative" images, where no object is present. The generated peak labels map is tagged with the image name retrieved from the annotation information. This is done to link generated label maps with the corresponding image during the training process. The generated and tagged peak labels maps are stored in peak label DB 930.

The label generator 920 functionality is further explained with the following example of a Gaussian shaped peak label. In this case, the label generator 920 receives the label size information from peak shape parameter calculator 918 and the label size is equivalent to variance of the Gaussian peak label. The object, or objects, position information retrieved from the annotation DB 914 and the position information is equivalent to the mean of the Gaussian peak label. Equipped with both mean and variance information, the Gaussian peak labels are generated by utilizing a Gaussian's equation. The orientation of the Gaussian peak label is, by default, along the axes. However, in some embodiments, the orientation is specified in the annotation by rotation angles based on an expected orientation of the object. If there are multiple objects, then a Gaussian peak label is generated at each of the object positions. The dimension, e.g., 2D or 3D, of the generated Gaussian peak label is given by the dimension of the mean and variance vectors.

Figure 15:
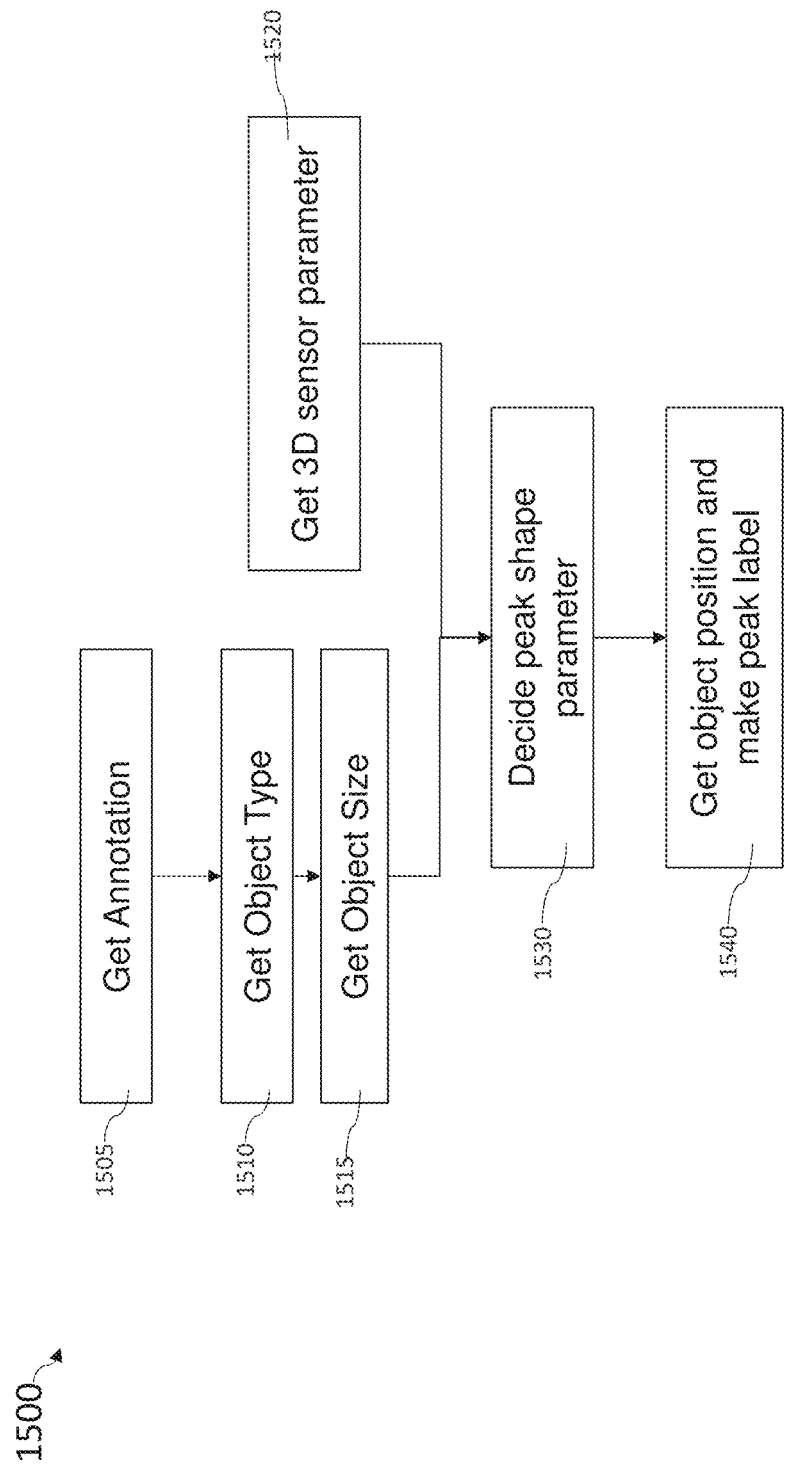
FIG. 15 is a flowchart of a method of generating a peak label in accordance with some embodiments.

FIG. 15 is a flowchart of a method 1500 of generating a peak label in accordance with some embodiments. In some embodiments, the method 1500 is implemented using the peak label generator subsystem 900 (FIG. 9). IN some embodiments, the method 1500 is implemented using the peak label generator subsystem 310 (FIG. 3).

In operation 1505, an annotation is retrieved from an annotation DB, e.g., annotation DB 914.

In operation 1510, an object type is retrieved based on an object type tag for an entry in the annotation retrieved in operation 1505.

In operation 1515, the object size is retrieved from an object size DB, e.g., the object size DB 912 (FIG. 9). For example, if the object type from operation 1510 is a handgun then dimensions of the handgun object type are retrieved by querying the object size DB using the handgun object type.

In operation 1520, 3D sensor information is retrieved from 3D a sensor parameter DB, e.g., the 3D sensor parameter DB 916. In some embodiments, the 3D sensor information includes voxel size. In some embodiments, the 3D sensor information includes resolution information or other suitable information. In some embodiments, the operation 1520 is performed simultaneously with at least one of operation 1510 or operation 1515. In some embodiments, the operation 1520 is performed prior to or after at least one of operation 1510 or operation 1515.

In operation 1530, a peak shape parameter calculator, e.g., the peak shape parameter calculator 918 (FIG. 9), decides a peak label size and shape. The peak label size and shape are based on the object size information from operation 1515 and the 3D sensor parameter information from operation 1520. In some embodiments, the object type is a handgun and the 3D sensor parameter information includes voxel size, the label size is decided as given in Equation 1. In some embodiments, peak label shape is Gaussian then this label size refers to a variance of the peak label.

In operation 1540, the object position is retrieved and a peak label is generated. The object position retrieved from the annotation DB, e.g., the annotation DB 914 (FIG. 9). In some embodiments, the object orientation is also retrieved from the annotation DB. In some embodiments, where the peak label is a Gaussian, the generated peak label includes a Gaussian having center at the object position and having a variance provided by the peak label size determined in operation 1530. The dimension of the generated Gaussian label are 2D or 3D depending on whether the sensor is able to detect depth dimension. The orientation of the Gaussian is, by default, along the axes. However, in some embodiments, the orientation is different and is specified by rotation angles given by the annotation DB. In some embodiments, the generated peak labels map are tagged with the image ID. In some embodiments, the generated peak labels are stored in a DB for later use.

In some embodiments, the method 1500 includes at least one additional operation. For example, in some embodiments, the method 1500 includes displaying the peak label shape. In some embodiments, at least one operation of the method 1500 is omitted. For example, in some embodiments, the operation 1510 is omitted and the object size is retrieved based on the data received directly from operation 1505. In some embodiments, an order of operations of the method 1500 is adjusted. For example, in some embodiments, the operation 1520 is performed prior to the operation 1505. One of ordinary skill in the art would recognize that additional modifications to the method 1500 are within the scope of this description.

As described above, the peak label generation helps to resolve the challenge of labeling for low resolution images, by reducing labeling time and effort. This is achieved by generating peak shape labels which are based on a center potion of the object. Also the peak labels are able to absorb inaccuracy in object position and hence are usable for training an accurate PLODS.

Figure 16:
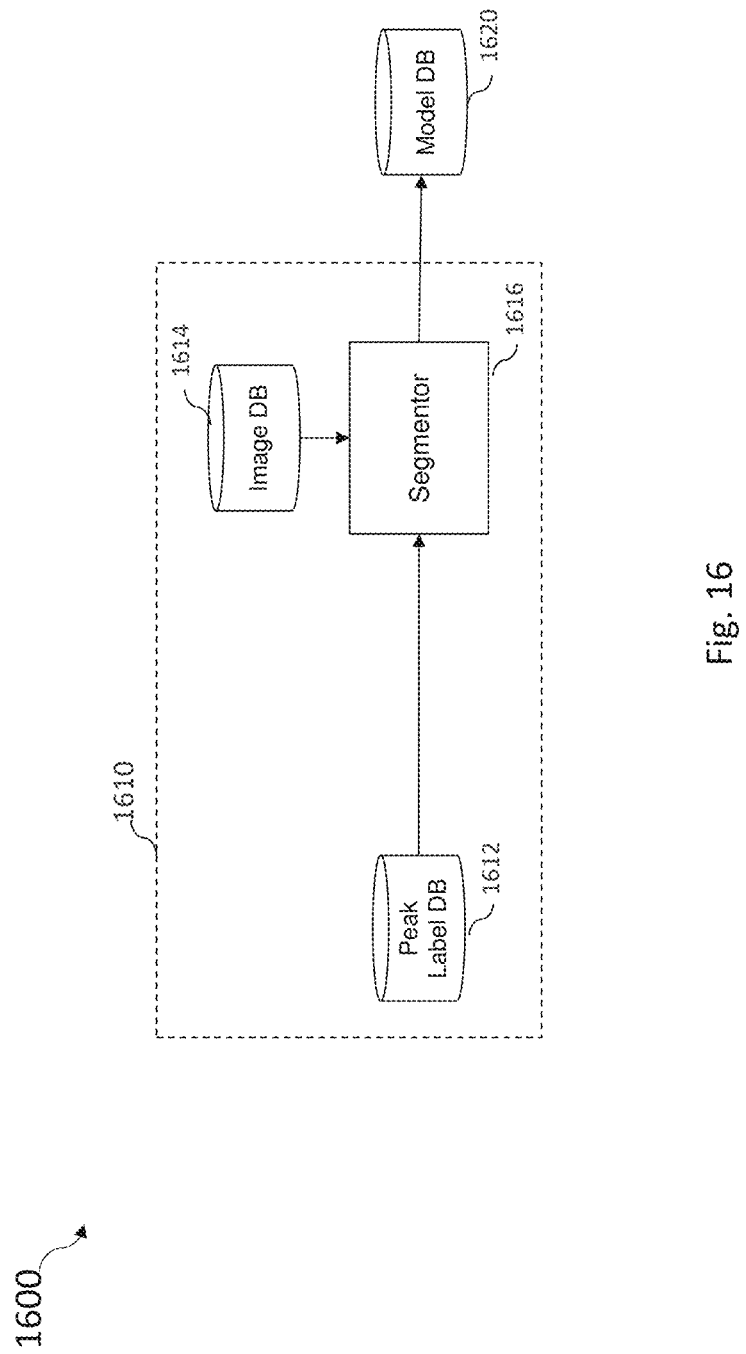
FIG. 16 is a functional diagram of a PLOD training subsystem in accordance with some embodiments.

FIG. 16 is a functional diagram of a PLOD training subsystem 1610 in accordance with some embodiments. In some embodiments, the PLOD training subsystem 1610 is usable as the PLOD training subsystem 330 (FIG. 3). The PLOD training subsystem is usable to train a neural network for object detection based on information from a peak label generator subsystem.

The PLOD training subsystem 1600 includes a peak label DB 1612, a segmentor 1616, and an image DB 1614. The peak label DB 1612 contains the peak labels maps generated by a peak label generator subsystem. In some embodiments, the peak label generator subsystem includes peak label generator subsystem 900 (FIG. 9). In some embodiments, the peak label generator subsystem includes peak label generator subsystem 320 (FIG. 3). The generated peak labels maps are tagged with image ID to link with the corresponding image in training. An example of a Gaussian peak label map where the object is a weapon is provided above with respect to FIG. 7.

The image DB 1614 stores images which were captured by a 3D sensor, e.g., RADAR detector 210 (FIG. 2). Imaging parameters of the 3D sensor are stored in a 3D sensor parameter DB, e.g., 3D sensor parameter DB 916 (FIG. 9). The images in image DB 1614 are usable for training the segmentor 1616. In some embodiments, the images are 2D images. In some embodiments, the images are 3D images.

The segmentor 1616 retrieves the image from the image DB 1614 by using the image identifying information present in the peak label from the peak label DB 1612. The segmentor 1616 learns to generate prediction peaks from input images from image DB 1614. On receiving a peak label map from the peak label DB 1612, the segmentor 1616 retrieves the corresponding image from image DB 1614 using the image ID information present in the peak label. The segmentor 1616 includes a machine learning based segmentation neural-network which is trained in a fully or semi supervised fashion utilizing the image and the corresponding peak label map. In some embodiments, the segmentor 1616 includes a fully-convolutional neural-network architecture. This class of neural network takes as input an image and outputs a similarly-sized density map often referred-to as segmentation models or segmentors. The learned or trained segmentor is also usable during a prediction phase or implementation phase. The target task for the trained segmentor 1616 is to predict a peak shape for situations where an object-of-interest is present in the input image. In some embodiments, the segmentor 1616 is also configured to predict the position of the peak shape marking the position of the object-of-interest.

The segmentor 1616 undergoes learning or training by updating weights/parameters until a stopping criteria is reached. In some embodiments, the stopping criteria is determined by an upper bound on the training iterations or a lower bound on the error metric being optimized, e.g. loss or some other method. Once the training is done then the trained parameters of the segmentor 1616 are stored as a "trained model" in the model DB 1620.

Figure 17:
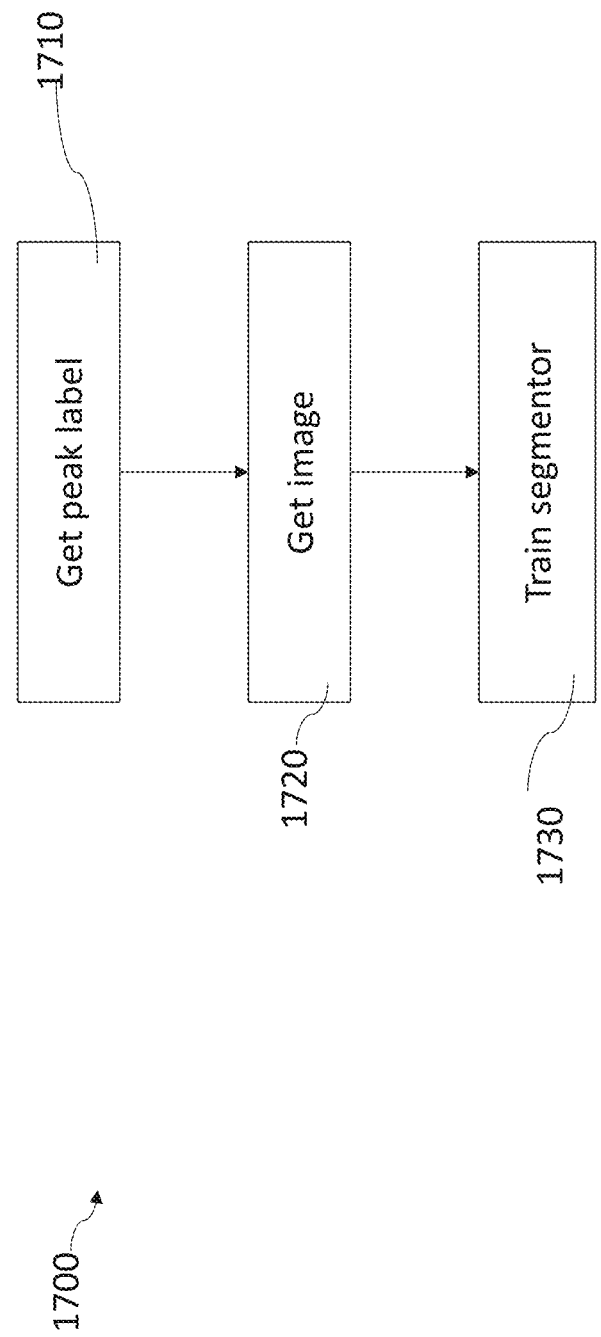
FIG. 17 is a flowchart of a method of training a PLOD subsystem in accordance with some embodiments.

FIG. 17 is a flowchart of a method 1700 of training a PLOD subsystem in accordance with some embodiments. In some embodiments, the method 1700 is implemented using the PLOD training subsystem 1600 (FIG. 16). In some embodiments, the method 1700 is implemented using the PLOD training subsystem 330 (FIG. 3). The peak label maps are generated and stored in a peak label DB, e.g., the peak label DB 1612 (FIG. 16), and also the images are measured by 3D sensor and stored in an image DB, e.g., the image DB 1614 (FIG. 16).

In operation 1710, a peak label is retrieved from the peak label DB. In some embodiments, the peak label is retrieved from the peak label DB using the segmentor, e.g., segmentor 1616 (FIG. 16). In some embodiments, multiple peak labels are retrieved from the peak label DB. A number of peak labels retrieved is determined based on a number of objects being sought in the training of the segmentor.

In operation 1720, an image is retrieved from the image DB using the image identifying tag from peak label. In some embodiments, the image is retrieved from the image DB using a segmentor, e.g., segmentor 1616 (FIG. 16). In some embodiments, multiple images are retrieved from the image DB. In some embodiments, the image is retrieved from the image DB based on an image identification from a peak label.

In operation 1730, the segmentor, e.g., the segmentor 1616 (FIG. 16) is trained using the image from operation 1710 and the peak label from operation 1720. The training process is performed by updating the parameters or weights of the segmentor. The update value is proportional to the error between the peak label and the prediction of the segmentor on the given image. Once a stopping criteria is reached, e.g., bound on training iterations or prediction error, then the training process is stopped. The trained parameters or weights are stored as "trained model" in the model DB, e.g., model DB 1620 (FIG. 16).

In some embodiments, the method 1700 includes at least one additional operation. For example, in some embodiments, the method 1700 includes displaying the weights and parameters of the segmentor during the training. In some embodiments, an order of operations of the method 1700 is adjusted. For example, in some embodiments, the operation 1720 is performed prior to the operation 1710. One of ordinary skill in the art would recognize that additional modifications to the method 1700 are within the scope of this description.

As described above, the PLOD training subsystem helps to resolve the low performance problem of object detector for low resolution images. This is achieved by the training the segmentor with peak shape labels which absorb inaccuracy in ground truth position of the object. This enables performing object detection in low resolution images with good performance using the trained segmentor.

Figure 18:
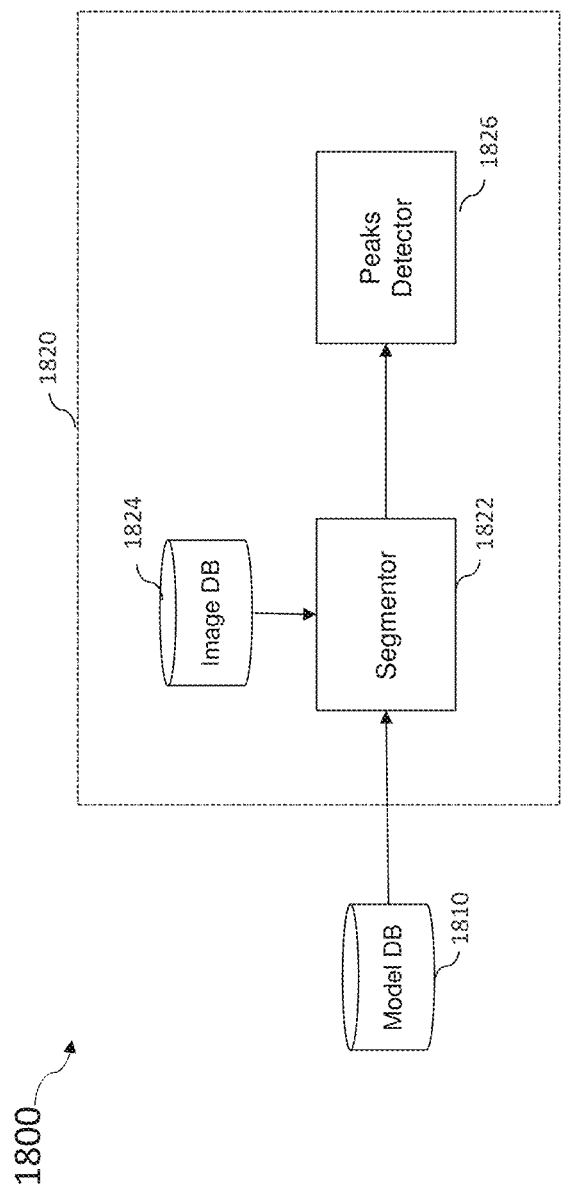
FIG. 18 is a functional diagram of a PLOD detection subsystem in accordance with some embodiments.

FIG. 18 is a functional diagram of a PLOD detection subsystem 1800 in accordance with some embodiments. In some embodiments, the PLOD detection subsystem 1800 is usable as the PLOD detection subsystem 340 (FIG. 3). The PLOD detection subsystem is usable to detect objects, including concealed objects, using a trained segmentor.

The PLODS detection subsystem 1800 includes a segmentor 1822, an image DB 1824 and a peaks detector 1826. The image DB 1824 includes images captured from a sensor. In some embodiments, the sensor includes the RADAR detector 210 (FIG. 2). The images in the image DB 1824 are the source of data to be analyzed to determine whether any of object of interest is present. The segmentor 1822 receives the images from the image DB 1824. In some embodiments, the image DB 1824 is similar to the image DB 1614 (FIG. 16); however, the image DB 1824 is usable for detection instead of training. The images in the image DB 1824 are similar in dimension and captured by same 3D sensor as images in the image DB 1614.

In some embodiments, image acquisition and prediction are performed online. In some embodiments where the image acquisition and prediction are performed online, the image DB 1824 acts as a buffer between the 3D sensor and segmentor 1822. In some embodiments where the images were acquired before-hand by the 3D sensor, the image DB 1824 acts as a data source for the segmentor 1822.

The segmentor 1822 predicts the peak density map for images incoming from the image DB 1824 and outputs the predictions to the peaks detector 1826. In some embodiments, the segmentor 1822 is similar to the segmentor 1616 (FIG. 16). IN some embodiments, the segmentor 1822 includes a machine learning based segmentation network. The segmentor 1822 includes a same weights and parameters based on a training of a PLODS training subsystem, e.g., PLODS training subsystem 1600 (FIG. 16). In contrast to a segmentor in a PLODS training subsystem, the segmentor 1822 is operating in a prediction mode. The segmentor 1822 loads the "trained model" from a model DB 1810. In some embodiments, the model DB 1810 is equivalent to the model DB 1620 (FIG. 16). The trained model contains the weights or parameters of the segmentation network which were learned in training phase. Loading the trained model implies initializing the network with the said parameters or weights. The segmentor 1822 then performs prediction on input images using the learned parameters or weights of the segmentation network. The segmentor 1822 predicts a peak shape if an object-of-interest is present in the input image from the image DB 1824. The segmentor 1822 also predicts the position of the peak shape marking the position of the object-of-interest.

The peaks detector 1826 determines the object presence and the object position based on peak prediction map from the segmentor 1822. The function of the peaks detector 1826 is to detect or find peaks in the prediction output of the segmentor 1822. In some embodiments, the peaks detector 1826 uses standard library functions for locating peaks by checking each point in the prediction and comparing the points with neighboring values, e.g. numpy, scipy, etc. If a peak is detected in the predicted map of points then the peak signifies that an object-of-interest is present and the location of peak marks the position of object.

In some embodiments, the parameters of the peaks detector 1826 include minimum height of permissible peak, minimum distance between two peaks, etc. The minimum height of permissible peak acts as the thresholding mechanism equivalent to score threshold of traditional object detection systems. Whereas the minimum distance between two peaks parameter helps control the computation complexity of this block, as the minimum distance increases the complexity decreases.

Figure 19:
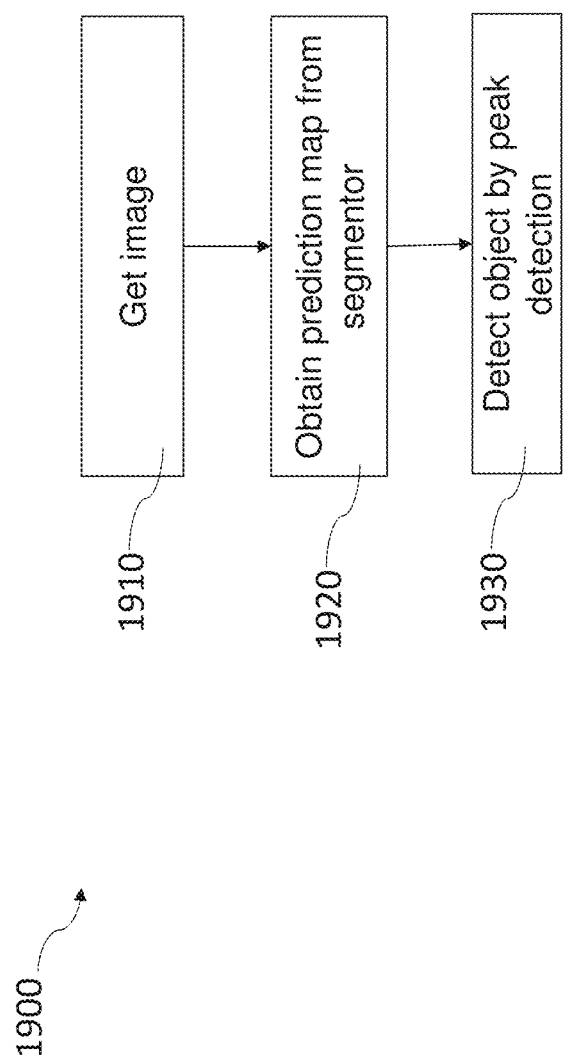
FIG. 19 is a flowchart of a method of detecting an object using a PLOD detection system in accordance with some embodiments.

FIG. 19 is a flowchart of a method 1900 of detecting an object using a PLOD detection system in accordance with some embodiments. In some embodiments, the method 1900 is implemented using the PLODS detection system 1800 (FIG. 18). In some embodiments, the method 1800 is implemented using the PLODS detection system 350 (FIG. 3). A trained model is loaded into a segmentor, e.g., segmentor 1822 (FIG. 18). Prediction images are available in an image DB, e.g., image DB 1824, either buffered after being measured online or stored after offline measurement.

In operation 1910, an image is retrieved from the image DB 307, e.g., image DB 1824 (FIG. 18). In some embodiments, the images are received after an online measurement. In some embodiments, the images are received after an offline measurement.

In operation 1920, the image is used by a segmentor, e.g., segmentor 1822 (FIG. 18), to predict a peak density map. If the input image has one or more objects of interest then the predicted peak map includes one or more peaks. A number of peaks correspond to a number of potential objects of interest. A position of a peak marks the position of the potential object of interest.

In operation 1930, the predicted peak map is used by a peaks detector, e.g., peaks detector 1826 (FIG. 18), to detect one or more objects and a position of each object. The peaks detector detects objects by finding peaks. In some embodiments, a standard peak finder algorithm is used to locate the peaks. Presence of peaks signifies that objects-of-interest are detected and mark the position of the object of interest. If no peaks are found, no objects-of-interest are present in the input image.

In some embodiments, the method 1900 includes at least one additional operation. For example, in some embodiments, the method 1900 includes a notification operation to alert an operator to a detected object. In some embodiments, the notification includes an audio or visual notification. In some embodiments, the notification includes an image of the target, e.g., target 110 (FIG. 2A) and a highlighted area at a determined position of a detected object. In some embodiments, the notification includes providing an alert to the operator. In some embodiments, the alert is configured to automatically generate an audio or visual alert on a device, such as a mobile device, accessible by the operator. In some embodiments, the alert is transmitted wirelessly. In some embodiments, the alert is transmitted via a wired connection. One of ordinary skill in the art would recognize that additional modifications to the method 1900 are within the scope of this description.

As described above, the detection subsystem 1800 enables performing object detection despite inaccuracies in ground truth labels. This enables to achieve training with only a center position annotation for the object, while absorbing inaccuracy in the object position. This enables object detection in low resolution images with good performance, and with minimal labeling effort.

Figure 20:
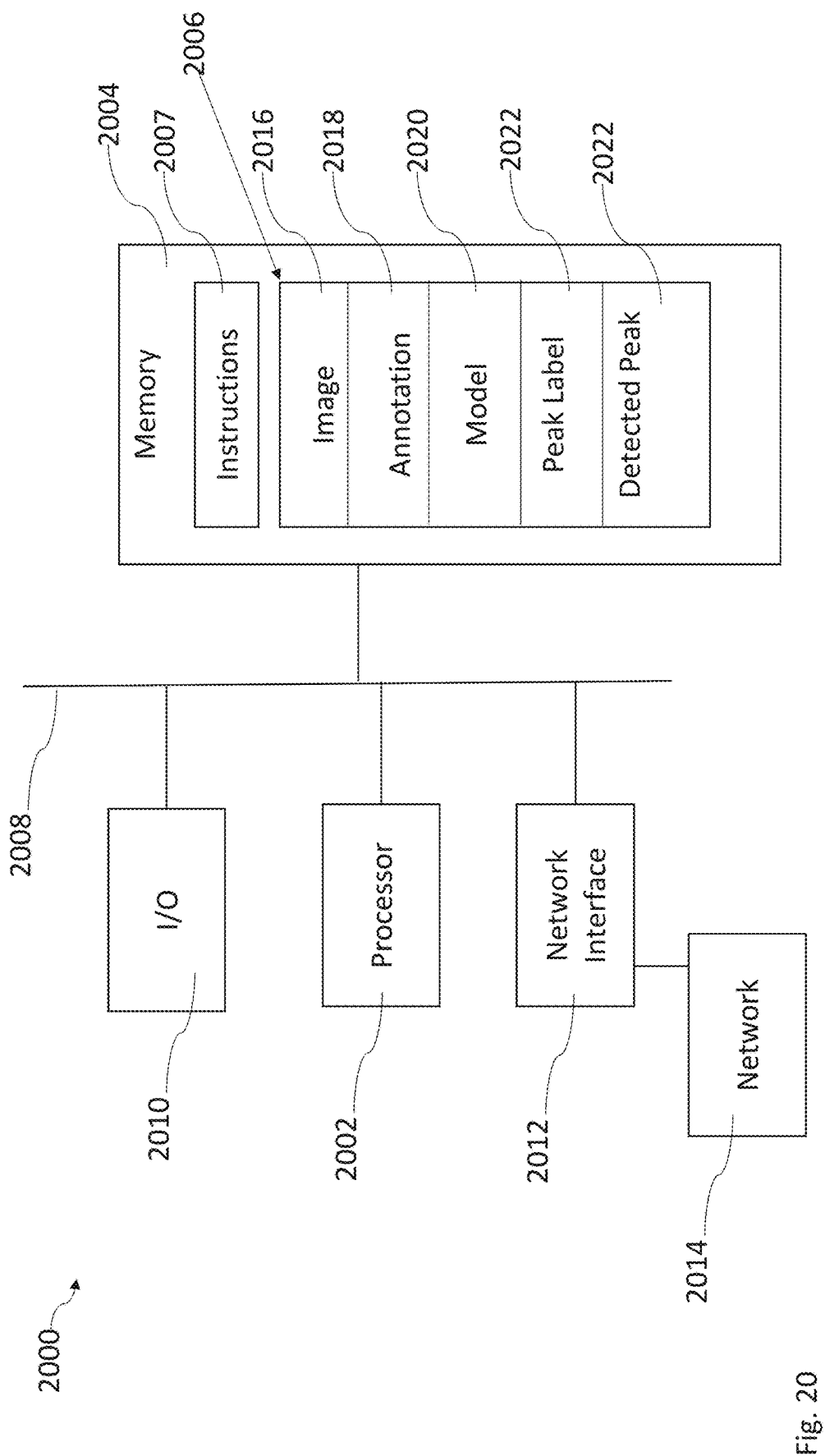
FIG. 20 is a block diagram of a system for implementing PLOD in accordance with some embodiments.

FIG. 20 is a block diagram of a system for implementing PLOD in accordance with some embodiments. System 2000 includes a hardware processor 2002 and a non-transitory, computer readable storage medium 2004 encoded with, i.e., storing, the computer program code 2006, i.e., a set of executable instructions. Computer readable storage medium 2004 is also encoded with instructions 2007 for interfacing with external devices. The processor 2002 is electrically coupled to the computer readable storage medium 2004 via a bus 2008. The processor 2002 is also electrically coupled to an I/O interface 2010 by bus 2008. A network interface 2012 is also electrically connected to the processor 2002 via bus 2008. Network interface 2012 is connected to a network 2014, so that processor 2002 and computer readable storage medium 2004 are capable of connecting to external elements via network 2014. The processor 2002 is configured to execute the computer program code 2006 encoded in the computer readable storage medium 2004 in order to cause system 2000 to be usable for performing a portion or all of the operations as described PLODS 300 (FIG. 3), method 400 (FIG. 4), PLODS label generator subsystem 900 (FIG. 9), method 1500 (FIG. 15), PLODS training subsystem 1600 (FIG. 16), method 1700 (FIG. 17), PLODS detection subsystem 1800 (FIG. 18), or method 1900 (FIG. 19).

In some embodiments, the processor 2002 is a central processing unit (CPU), a multi-processor, a distributed processing system, an application specific integrated circuit (ASIC), and/or a suitable processing unit.

In some embodiments, the computer readable storage medium 2004 is an electronic, magnetic, optical, electromagnetic, infrared, and/or a semiconductor system (or apparatus or device). For example, the computer readable storage medium 2004 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 2004 stores the computer program code 2006 configured to cause system 2000 to perform a portion or all of the operations as described PLODS 300 (FIG. 3), method 400 (FIG. 4), PLODS label generator subsystem 900 (FIG. 9), method 1500 (FIG. 15), PLODS training subsystem 1600 (FIG. 16), method 1700 (FIG. 17), PLODS detection subsystem 1800 (FIG. 18), or method 1900 (FIG. 19). In some embodiments, the storage medium 2004 also stores information needed for performing a portion or all of the operations as described PLODS 300 (FIG. 3), method 400 (FIG. 4), PLODS label generator subsystem 900 (FIG. 9), method 1500 (FIG. 15), PLODS training subsystem 1600 (FIG. 16), method 1700 (FIG. 17), PLODS detection subsystem 1800 (FIG. 18), or method 1900 (FIG. 19) as well as information generated during performing a portion or all of the operations as described PLODS 300 (FIG. 3), method 400 (FIG. 4), PLODS label generator subsystem 900 (FIG. 9), method 1500 (FIG. 15), PLODS training subsystem 1600 (FIG. 16), method 1700 (FIG. 17), PLODS detection subsystem 1800 (FIG. 18), or method 1900 (FIG. 19), such as an image parameter 2016, an annotation parameter 2018, a model parameter 2020, a peak label parameter 2022, a detected peak parameter 2024 and/or a set of executable instructions to perform the operation of a portion or all of the operations as described PLODS 300 (FIG. 3), method 400 (FIG. 4), PLODS label generator subsystem 900 (FIG. 9), method 1500 (FIG. 15), PLODS training subsystem 1600 (FIG. 16), method 1700 (FIG. 17), PLODS detection subsystem 1800 (FIG. 18), or method 1900 (FIG. 19).

In some embodiments, the storage medium 2004 stores instructions 2007 for interfacing with external devices, such as a mobile device accessible by the operator. The instructions 2007 enable processor 2002 to generate instructions readable by the external device to effectively implement a portion or all of the operations as described PLODS 300

(FIG. 3), method 400 (FIG. 4), PLODS label generator subsystem 900 (FIG. 9), method 1500 (FIG. 15), PLODS training subsystem 1600 (FIG. 16), method 1700 (FIG. 17), PLODS detection subsystem 1800 (FIG. 18), or method 1900 (FIG. 19).

System 2000 includes I/O interface 2010. I/O interface 2010 is coupled to external circuitry. In some embodiments, I/O interface 2010 includes a keyboard, keypad, mouse, trackball, trackpad, and/or cursor direction keys for communicating information and commands to processor 2002.

System 2000 also includes network interface 2021 coupled to the processor 2002. Network interface 2012 allows system 2000 to communicate with network 2014, to which one or more other computer systems are connected. Network interface 2012 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described PLODS 300 (FIG. 3), method 400 (FIG. 4), PLODS label generator subsystem 900 (FIG. 9), method 1500 (FIG. 15), PLODS training subsystem 1600 (FIG. 16), method 1700 (FIG. 17), PLODS detection subsystem 1800 (FIG. 18), or method 1900 (FIG. 19) is implemented in two or more systems 200, and information is exchanged between different systems 2000 via network 2014.

An aspect of this description relates a peak label object detection system (PLODS). The PLODS includes an object size database configured to store information related to object size for a plurality of objects. The PLODS further includes a three-dimensional (3D) sensor database configured to store information related to parameters of a 3D sensor. The PLODS further includes an annotation database configured to store ground truth annotation information for images. The PLODS further includes a peak shape parameter calculator configured to determine a peak label size based on object size from the object size database and the parameters of the 3D sensor. The PLODS further includes a label generator configured to generate a peak labels map based on label size and the ground truth annotation information. In some embodiments, the parameters of the 3D sensor include voxel size information. In some embodiments, the parameters of the 3D sensor include resolution information for the 3D sensor. In some embodiments, the ground truth annotation information includes object type and object position information. In some embodiments, the label generator is configured to generate the peak labels map having a Gaussian shape. In some embodiments, the label generator is configured to determine a center of the peak label map based on the ground truth annotation information; and determine a variance of the peak label map based on the object size. In some embodiments, the PLODS further includes a peak label database configured to store the peak labels map generated by the label generator; an image database configured to store images captured by the 3D sensor; and a segmentor, wherein the PLODS is configured to train the segmentor to detect an object of interest based on the peak labels map and an input image from the image database. In some embodiments, the segmentor is configured to output a peak shape in response to identifying an object in the input image; and output a location of a peak marking a position of the identified object. In some embodiments, the PLODS further includes an image database configured to store images captured by the 3D sensor; a segmentor trained to predict a peaks density map based on input image from image database; and a peaks detector configured to detect an object and a position of the object based on peaks in the predicted peaks density map.

An aspect of this description relates to a peak label object detection (PLOD) method. The PLOD method includes retrieving an object type from an annotation database. The PLOD method further includes retrieving an object position from the annotation database. The PLOD method further includes retrieving an object size from an object size database based on the object type. The PLOD method further includes retrieving sensor parameters for a three-dimensional (3D) sensor from a sensor parameters database. The PLOD method further includes determining a peak label size based on the object type, the object size, and the sensor parameters. The PLOD method further includes generating a peak label map based on the peak label size and the object position. The PLOD method further includes receiving an image captured by the 3D sensor. The PLOD method further includes training a segmentor to predict a peak density map based on generated peak label map and the received image. The PLOD method further includes receiving a captured image from the 3D sensor. The PLOD method further includes predicting a peak density map, using the trained segmentor, based on the captured image. The PLOD method further includes determining whether an object is present in the captured image based on one or more peaks of the peak density map. In some embodiments, the PLOD method further includes notifying an operator in response to determining that the object is present in the captured image. In some embodiments, the object is a concealed object. In some embodiments, retrieving the sensor parameters includes retrieving a voxel size. In some embodiments, generating the peak label map includes generating the peak label map having a Gaussian shape. In some embodiments, retrieving the sensor parameters includes retrieving a resolution of the 3D sensor.

An aspect of this description relates to a non-transitory computer readable medium configured to store instructions thereon for causing a processor to retrieve an object type from an annotation database. The instructions are further configured to cause the processor to retrieve an object position from the annotation database. The instructions are further configured to cause the processor to retrieve an object size from an object size database based on the object type. The instructions are further configured to cause the processor to retrieve sensor parameters for a three-dimensional (3D) sensor from a sensor parameters database. The instructions are further configured to cause the processor to determine a peak label size based on the object type, the object size, and the sensor parameters. The instructions are further configured to cause the processor to generate a peak label map based on the peak label size and the object position. The instructions are further configured to cause the processor to receive an image captured by the 3D sensor. The instructions are further configured to cause the processor to train a segmentor to predict a peak density map based on generated peak label map and the received image. The instructions are further configured to cause the processor to receive a captured image from the 3D sensor. The instructions are further configured to cause the processor to predict a peak density map, using the trained segmentor, based on the captured image. The instructions are further configured to cause the processor to determine whether an object is present in the captured image based on one or more peaks of the peak density map. In some embodiments, the instructions are further configured to cause the processor to generate instructions for notifying an operator in response to determining that the object is present in the captured image. In some embodiments, the instructions are further configured to cause the processor to retrieve the sensor parameters comprising a voxel size. In some embodiments, the instructions are further configured to cause the processor to generate the peak label map having a Gaussian shape. In some embodiments, the instructions are further configured to cause the processor to retrieve the sensor parameters comprising a resolution of the 3D sensor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A peak label object detection system (PLODS) comprising:
    an object size database configured to store information related to object size for a plurality of objects;
    a three-dimensional (3D) sensor database configured to store information related to parameters of a 3D sensor;
    an annotation database configured to store ground truth annotation information for images;
    a peak shape parameter calculator configured to determine a peak label size based on the object size from the object size database and the parameters of the 3D sensor; and
    a label generator configured to generate a peak labels map based on the peak label size and the ground truth annotation information.

2. The PLODS according to claim 1, wherein the parameters of the 3D sensor include voxel size information.

3. The PLODS according to claim 1, wherein the parameters of the 3D sensor include resolution information for the 3D sensor.

4. The PLODS according to claim 1, wherein the ground truth annotation information includes object type and object position information.

5. The PLODS according to claim 1, wherein the label generator is configured to generate the peak labels map having a Gaussian shape.

6. The PLODS according to claim 1, wherein the label generator is configured to:
    determine a center of the peak label map based on the ground truth annotation information; and
    determine a variance of the peak label map based on the object size.

7. The PLODS according to claim 1, further comprising:
    a peak label database configured to store the peak labels map generated by the label generator;
    an image database configured to store images captured by the 3D sensor; and
    a segmentor, wherein the PLODS is configured to train the segmentor to detect an object of interest based on the peak labels map and an input image from the image database.

8. The PLODS according to claim 7, wherein the segmentor is configured to:
    output a peak shape in response to identifying an object in the input image; and output a location of a peak marking a position of the identified object.

9. The PLODS according to claim 1, further comprising:
    an image database configured to store images captured by the 3D sensor;
    a segmentor trained to predict a peaks density map based on input image from image database; and
    a peaks detector configured to detect an object and a position of the object based on peaks in the predicted peaks density map.

10. A peak label object detection (PLOD) method, the method comprising:
    retrieving an object type from an annotation database;
    retrieving an object position from the annotation database;
    retrieving an object size from an object size database based on the object type;
    retrieving sensor parameters for a three-dimensional (3D) sensor from a sensor parameters database;
    determining a peak label size based on the object type, the object size, and the sensor parameters;
    generating a peak label map based on the peak label size and the object position;
    receiving an image captured by the 3D sensor;
    training a segmentor to predict a peak density map based on generated peak label map and the received image;
    receiving a captured image from the 3D sensor;
    predicting a peak density map, using the trained segmentor, based on the captured image;
    determining whether an object is present in the captured image based on one or more peaks of the peak density map.

11. The PLOD method according to claim 10, further comprising notifying an operator in response to determining that the object is present in the captured image.

12. The PLOD method according to claim 10, wherein the object is a concealed object.

13. The PLOD method according to claim 10, wherein retrieving the sensor parameters comprises retrieving a voxel size.

14. The PLOD method according to claim 10, wherein generating the peak label map comprises generating the peak label map having a Gaussian shape.

15. The PLOD method according to claim 10, wherein retrieving the sensor parameters comprises retrieving a resolution of the 3D sensor.

16. A non-transitory computer readable medium configured to store instructions thereon for causing a processor to:
    retrieve an object type from an annotation database;
    retrieve an object position from the annotation database;
    retrieve an object size from an object size database based on the object type;
    retrieve sensor parameters for a three-dimensional (3D) sensor from a sensor parameters database;
    determine a peak label size based on the object type, the object size, and the sensor parameters;
    generate a peak label map based on the peak label size and the object position;
    receive an image captured by the 3D sensor;
    train a segmentor to predict a peak density map based on generated peak label map and the received image;
    receive a captured image from the 3D sensor;
    predict a peak density map, using the trained segmentor, based on the captured image;

determine whether an object is present in the captured image based on one or more peaks of the peak density map.

17. The non-transitory computer readable medium according to claim 16, wherein the instructions are further configured to cause the processor to generate instructions for notifying an operator in response to determining that the object is present in the captured image.

18. The non-transitory computer readable medium according to claim 16, wherein the instructions are further configured to cause the processor to retrieve the sensor parameters comprising a voxel size.

19. The non-transitory computer readable medium according to claim 16, wherein the instructions are further configured to cause the processor to generate the peak label map having a Gaussian shape.

20. The non-transitory computer readable medium according to claim 16, wherein the instructions are further configured to cause the processor to retrieve the sensor parameters comprising a resolution of the 3D sensor.

* * * * *